Sept. 5, 1939.  F. J. BINGLEY  2,171,536
ELECTRICAL SYSTEM
Filed Nov. 23, 1935   16 Sheets-Sheet 1

Inventor:
Frank J. Bingley
by his Attorneys
Howson & Howson

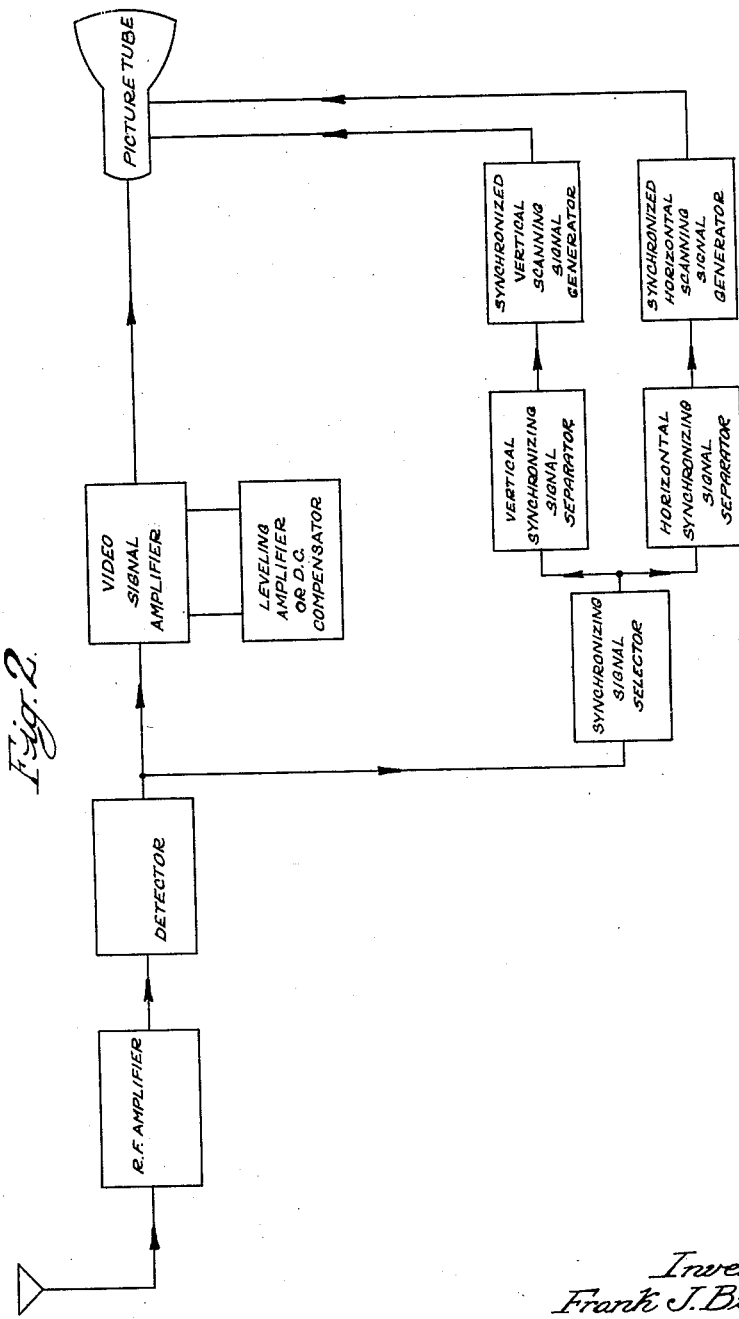

Sept. 5, 1939.   F. J. BINGLEY   2,171,536
ELECTRICAL SYSTEM
Filed Nov. 23, 1935   16 Sheets-Sheet 3
Fig. 4
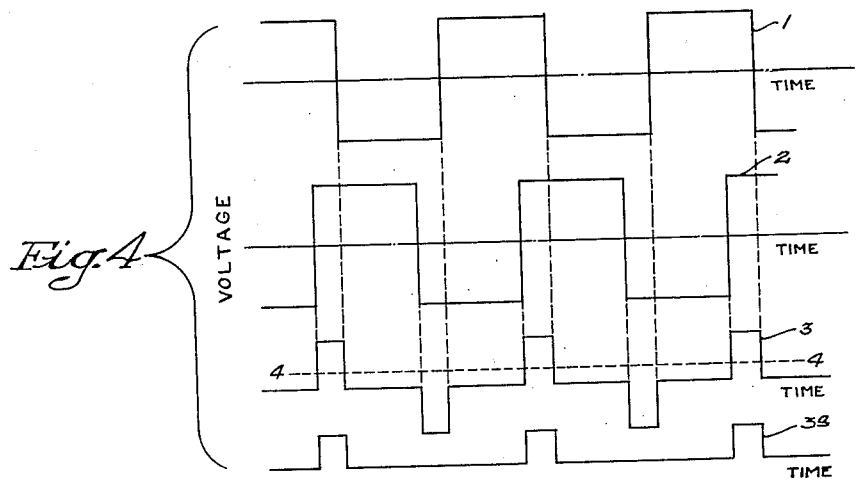
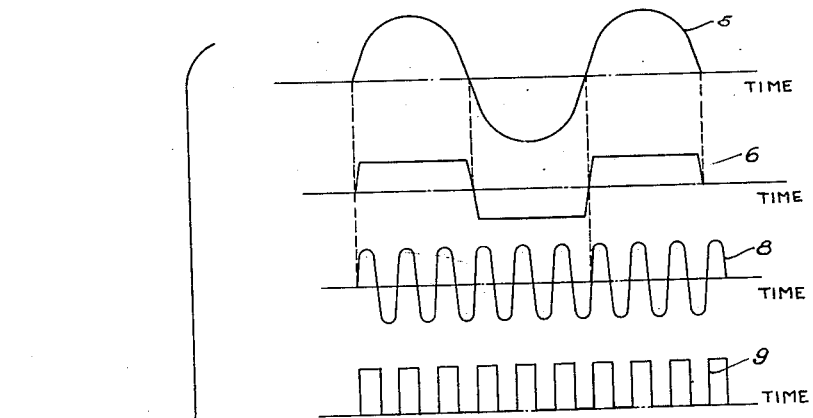
Fig. 5
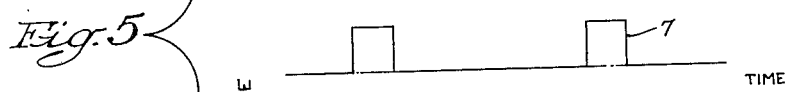
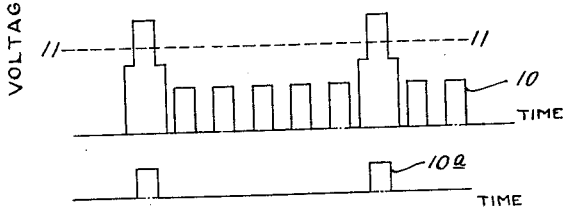
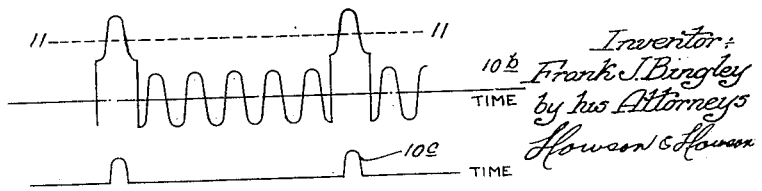
Inventor:
Frank J. Bingley
by his Attorneys
Howson & Howson

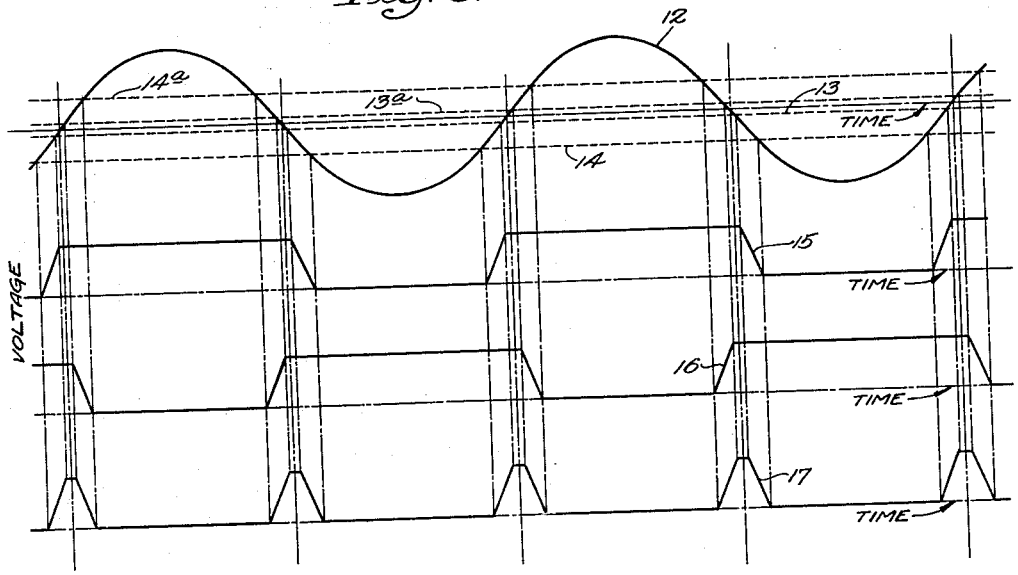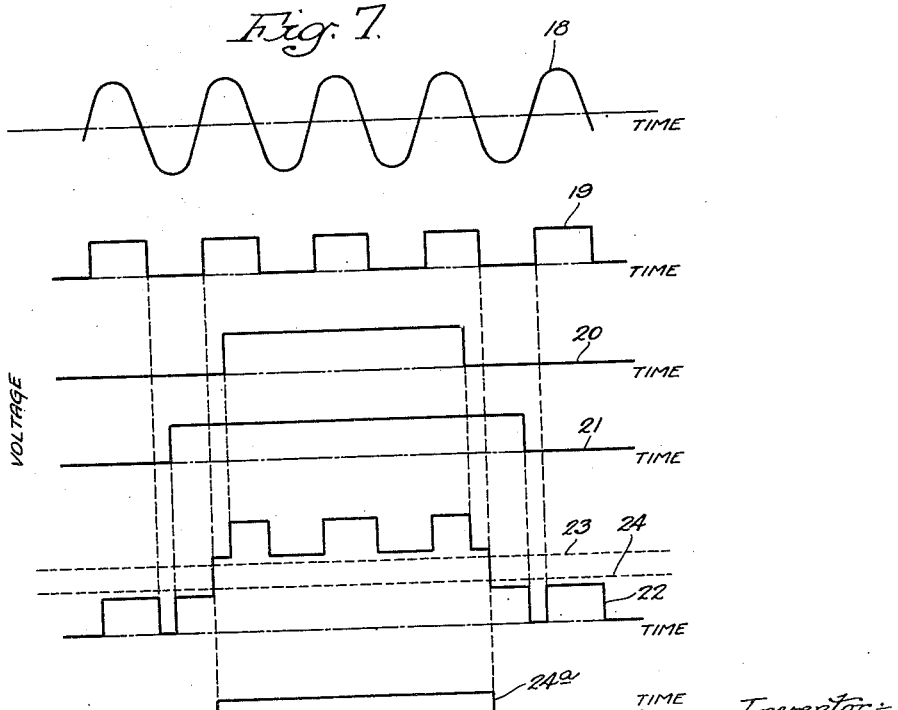

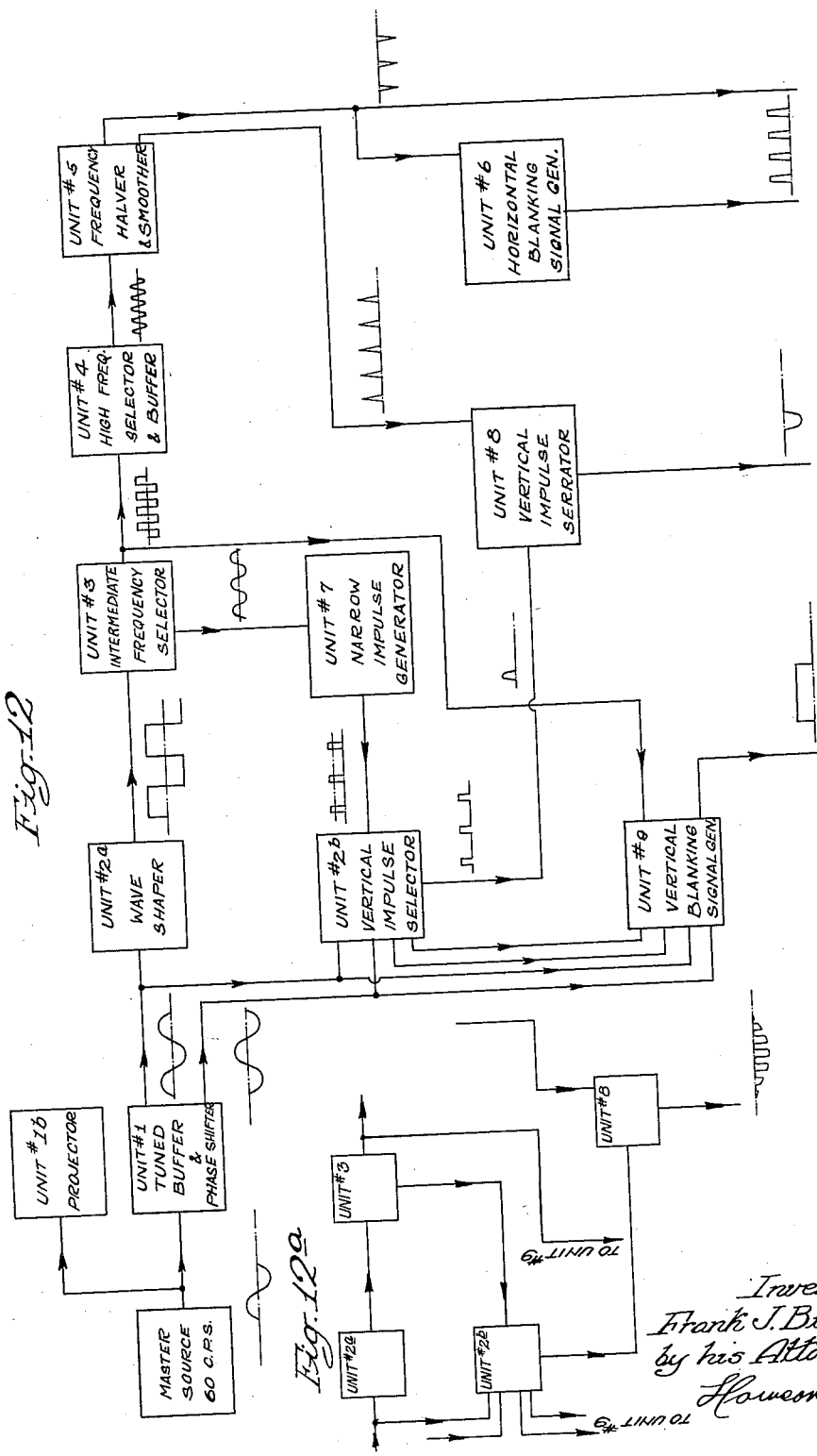

Sept. 5, 1939.　　　　　F. J. BINGLEY　　　　　2,171,536
ELECTRICAL SYSTEM
Filed Nov. 23, 1935　　　16 Sheets-Sheet 7
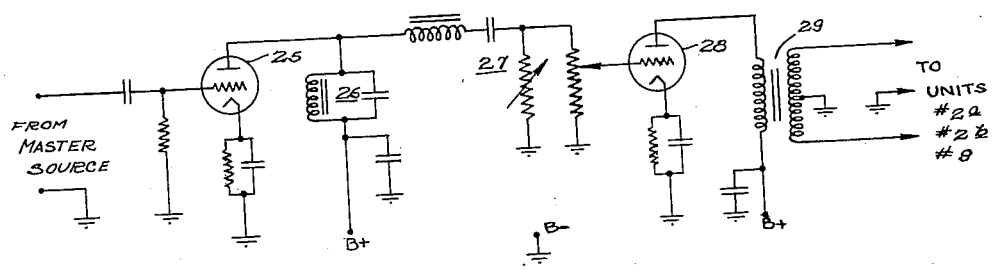
Fig. 13.　　Unit #1
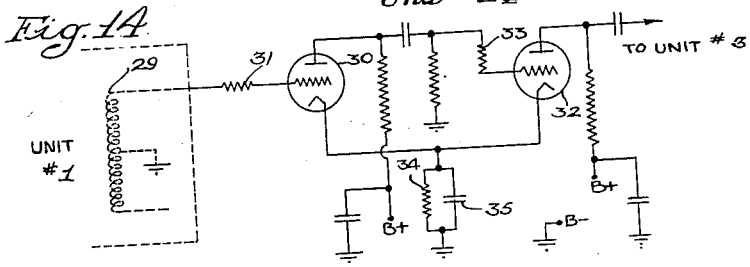
Fig. 14.　　Unit #2a
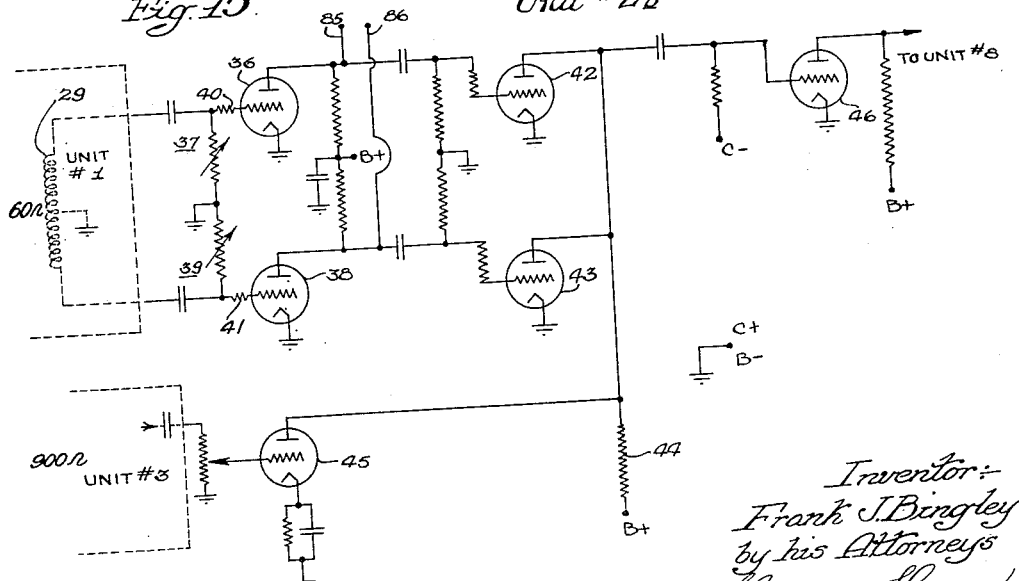
Fig. 15.　　Unit #2b
Inventor:-
Frank J. Bingley
by his Attorneys
Howson & Howson

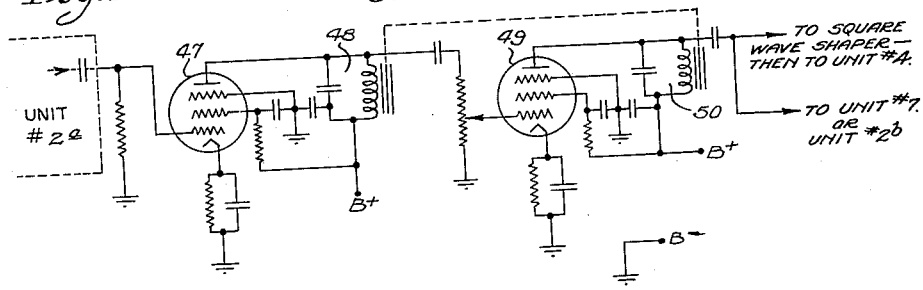
Fig. 16. Unit #3
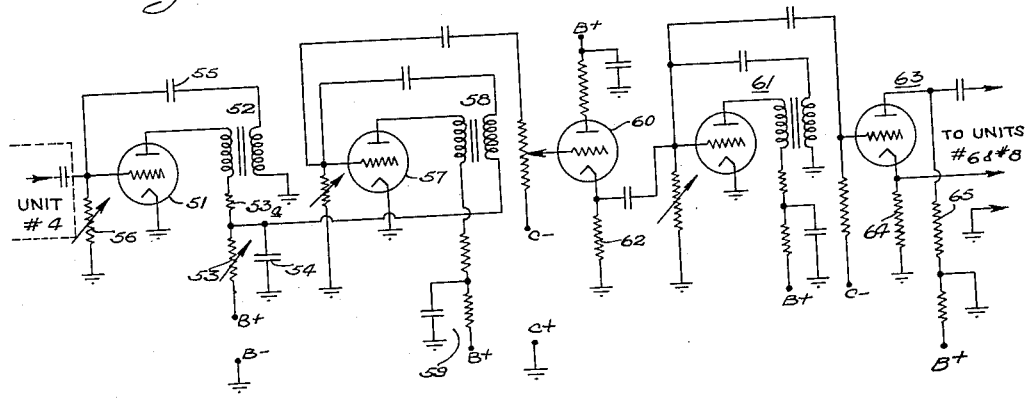
Fig. 17. Unit #5
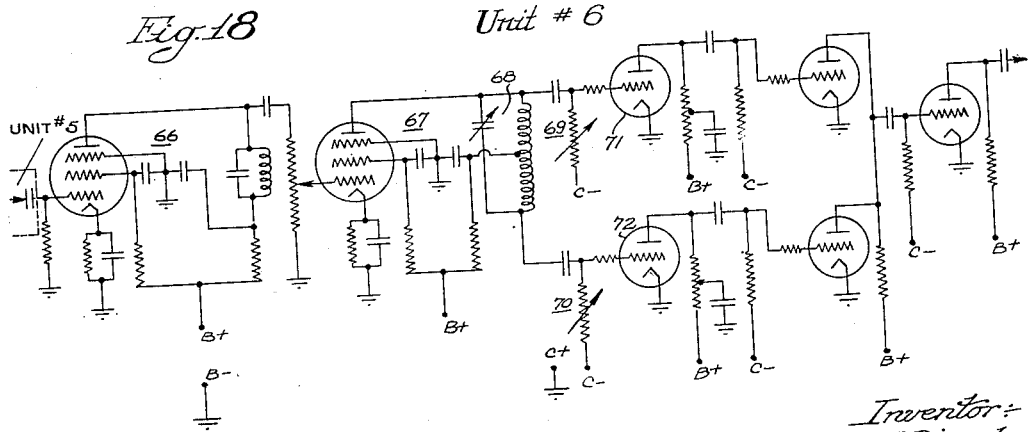
Fig. 18. Unit #6
Inventor:
Frank J. Bingley
by his Attorneys
Howson & Howson Sept. 5, 1939.    F. J. BINGLEY    2,171,536
ELECTRICAL SYSTEM
Filed Nov. 23, 1935    16 Sheets-Sheet 9
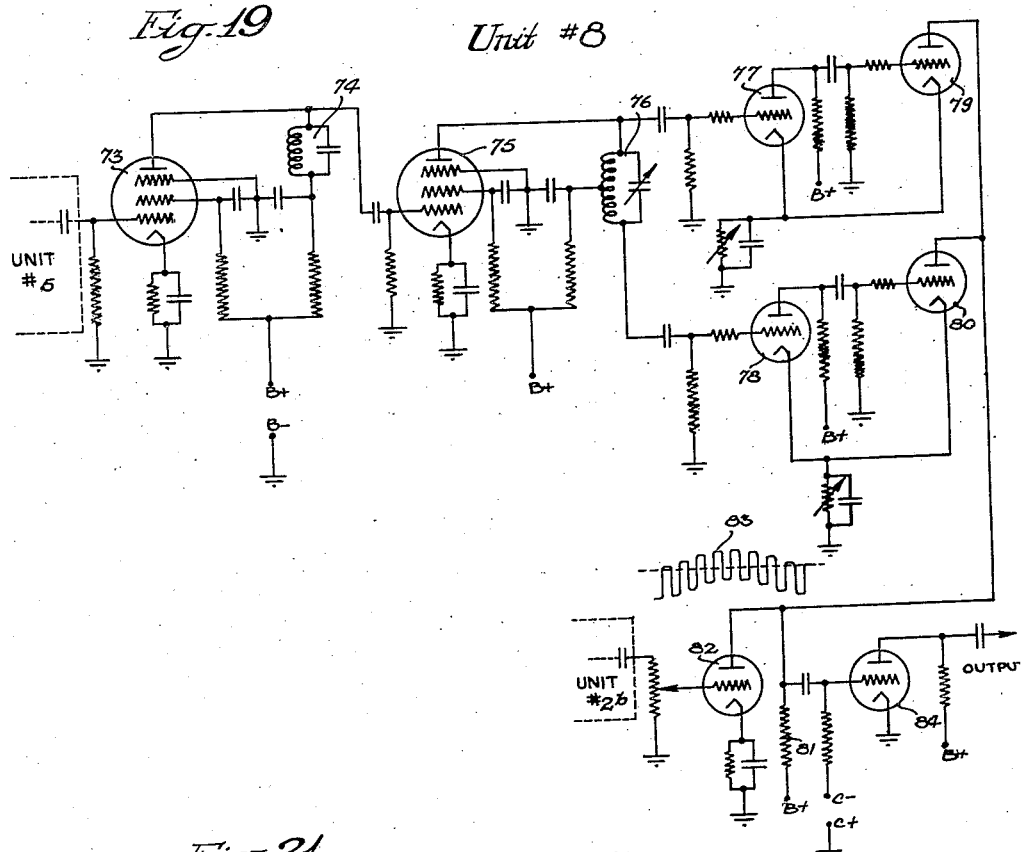
Fig. 19    Unit #8
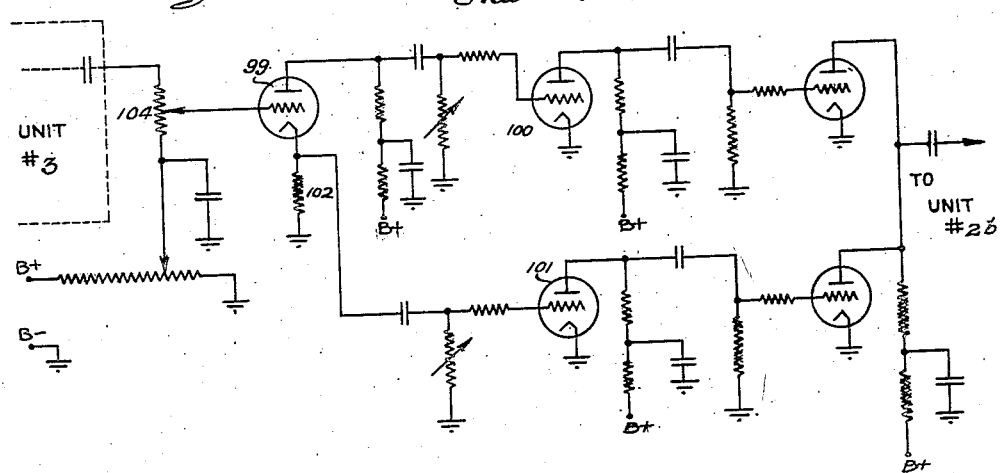
Fig. 21    Unit #7
Inventor:
Frank J. Bingley
by his Attorneys
Howson & Howson Sept. 5, 1939.　　　　F. J. BINGLEY　　　　2,171,536
ELECTRICAL SYSTEM
Filed Nov. 23, 1935　　　　16 Sheets-Sheet 10

Sept. 5, 1939.   F. J. BINGLEY   2,171,536
ELECTRICAL SYSTEM
Filed Nov. 23, 1935   16 Sheets–Sheet 11

Inventor:
Frank J. Bingley
by his Attorneys
Howson & Howson

Sept. 5, 1939.     F. J. BINGLEY     2,171,536
ELECTRICAL SYSTEM
Filed Nov. 23, 1935     16 Sheets-Sheet 12
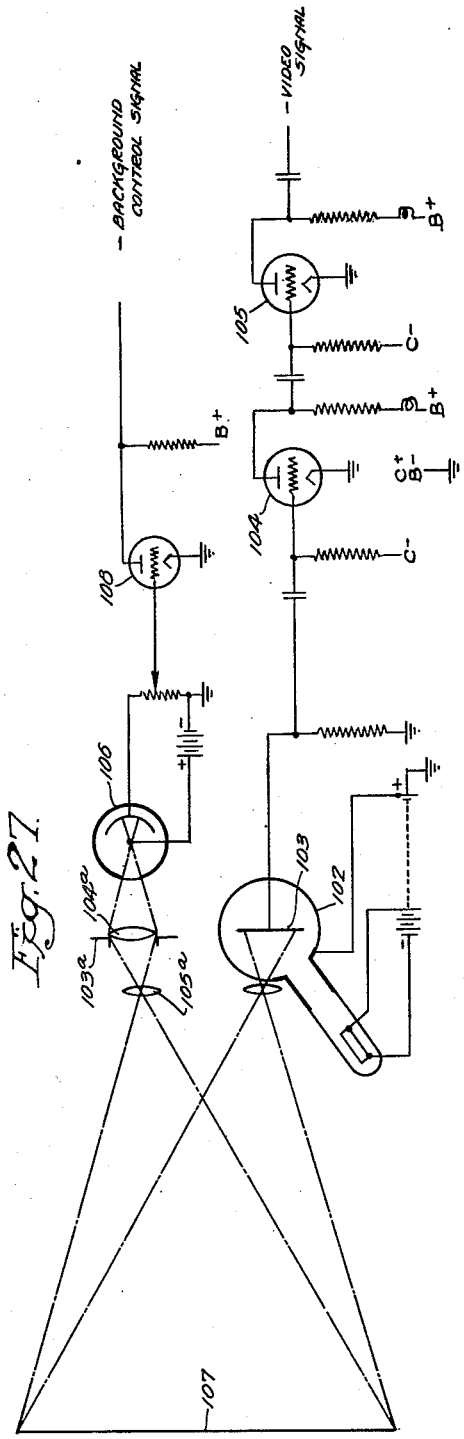
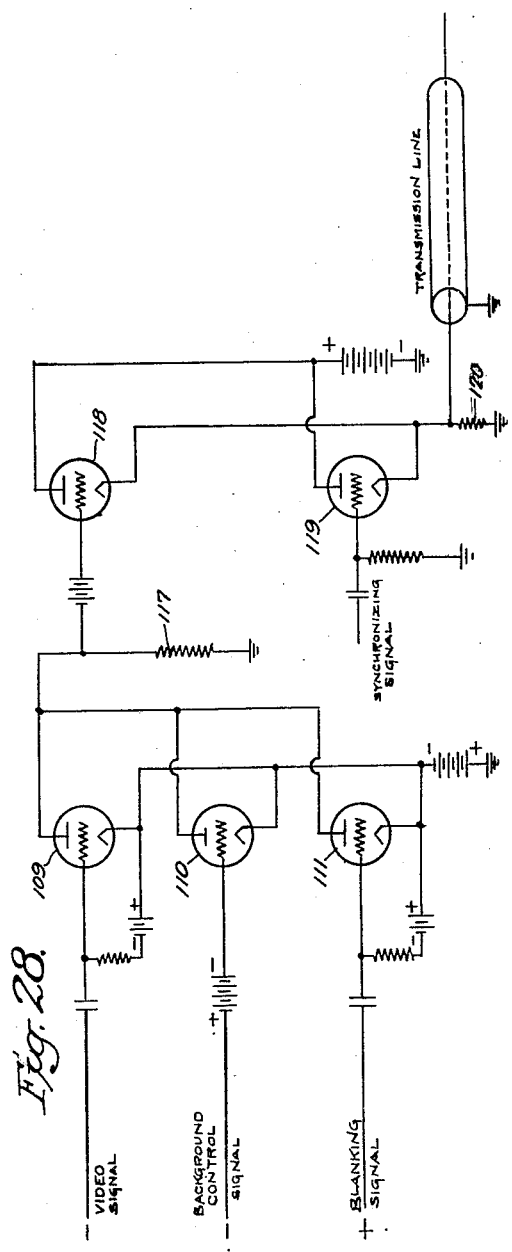
Inventor:
Frank J. Bingley
by his Attorneys
Howson & Howson Sept. 5, 1939.   F. J. BINGLEY   2,171,536
ELECTRICAL SYSTEM
Filed Nov. 23, 1935   16 Sheets-Sheet 13

Inventor:—
Frank J. Bingley
by his Attorneys
Howson & Howson

Sept. 5, 1939.  F. J. BINGLEY  2,171,536
ELECTRICAL SYSTEM
Filed Nov. 23, 1935  16 Sheets-Sheet 14

Inventor:-
Frank J. Bingley
by his Attorneys
Howson & Howson

Sept. 5, 1939.  F. J. BINGLEY  2,171,536
ELECTRICAL SYSTEM
Filed Nov. 23, 1935   16 Sheets-Sheet 15
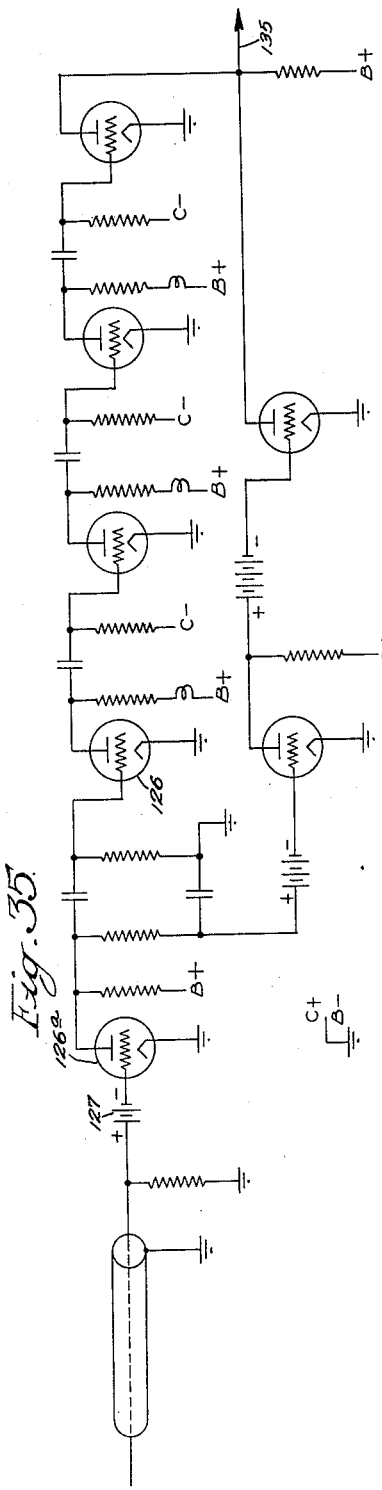
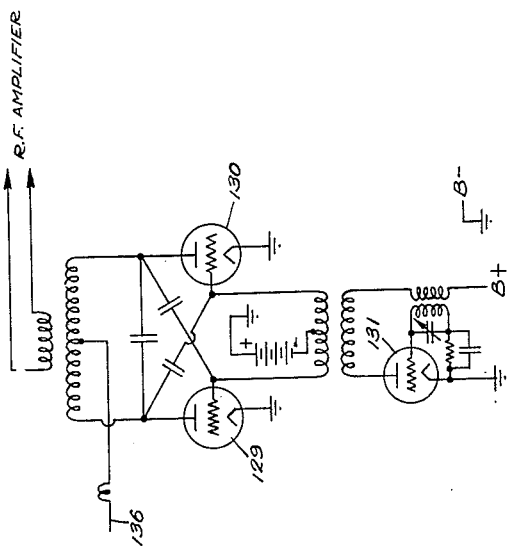
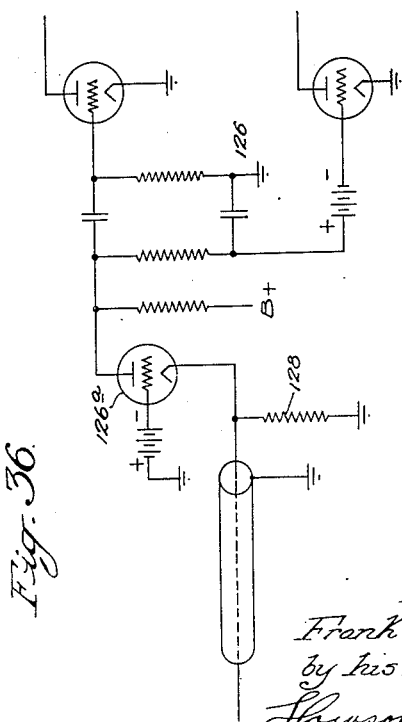
Inventor:-
Frank J. Bingley
by his Attorneys
Howson & Howson

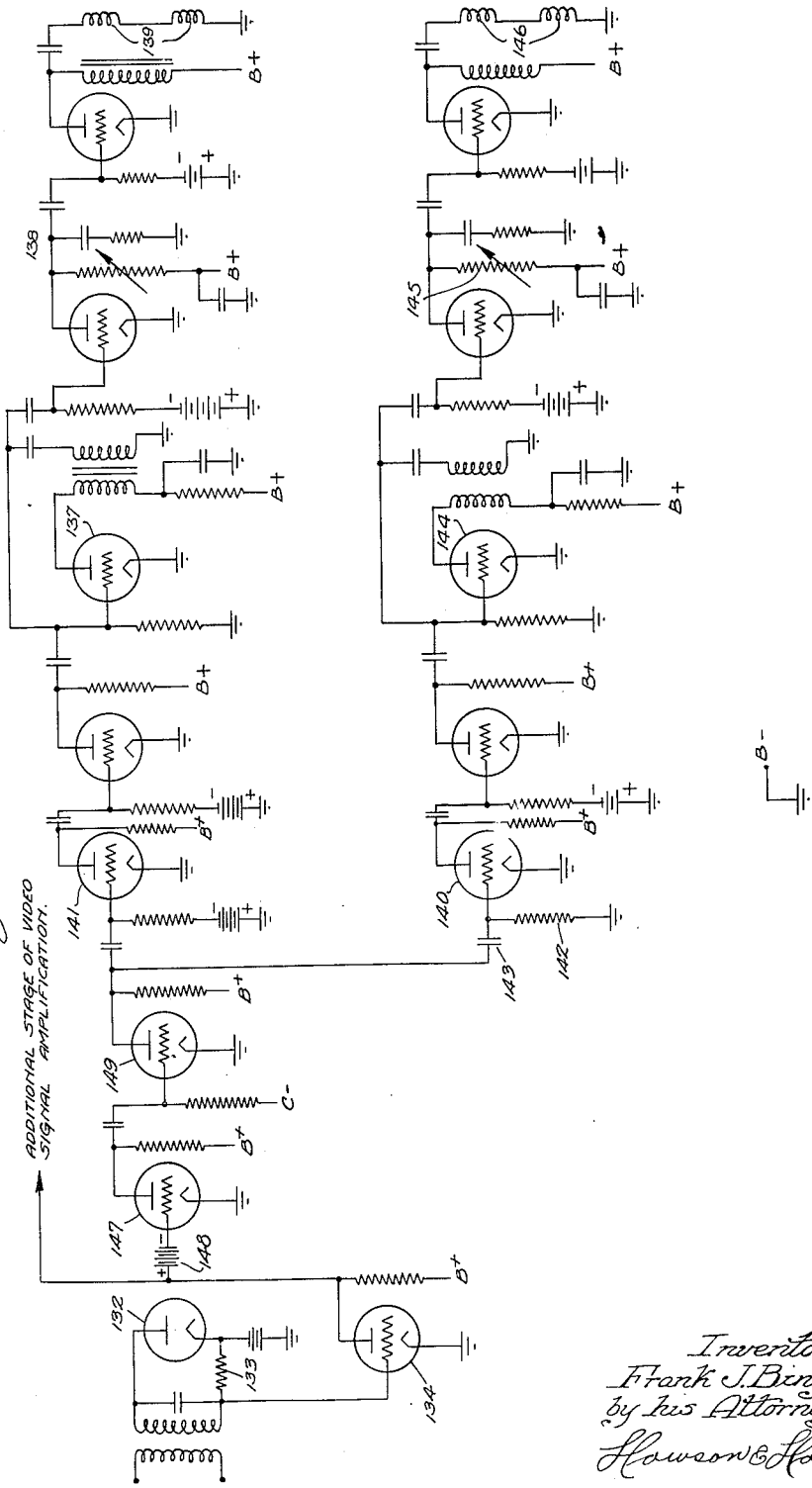

Patented Sept. 5, 1939

2,171,536

UNITED STATES PATENT OFFICE 2,171,536

ELECTRICAL SYSTEM

Frank J. Bingley, Mount Airy, Pa., assignor to Philco Radio & Television Corporation, Philadelphia, Pa., a corporation of Delaware Application November 23, 1935, Serial No. 51,324

38 Claims. (Cl. 178—6.8)

This invention relates to improvements and modifications in television and like systems and has for its general object the provision of certain novel features which are particularly applicable to television systems but which may be useful in other systems wherein electrical waves are transmitted.

Several of the features of my invention are claimed in divisional applications, Serial No. 282,504, filed July 1, 1939, and Serial Nos. 282,934, 282,935 and 282,933, filed July 5, 1939, respectively.

In a conventional television receiver employing a scanning beam, two types of synchronizing signals are usually necessary, one to synchronize the horizontal scanning or deflecting circuit of the receiver with that of the transmitter, and another to synchronize the vertical scanning or deflecting circuit of the receiver with that of the transmitter, although in certain cases only one signal serving both functions may be used. In conventional practice, it has been found desirable to transmit these synchronizing signals through the same signal channel which carries the video or picture signal, the practice being to blank out the video signal throughout the time intervals during which the synchronizing signals are transmitted.

In such a system, it is necessary that the time relation between the horizontal and vertical deflecting circuits be maintained constant with a high degree of precision to prevent distortion of the picture due to irregular scanning. In the case where a motion picture film is being scanned at the transmitter, it is further necessary that the two deflecting systems be synchronized with respect to the mechanism driving the film to prevent distortion due to time displacements between the mechanical system and the electrical system. The present invention provides means for obtaining a plurality of periodic impulses having different frequencies but bearing a fixed relation with respect to each other and with respect to a signal from a master source which may, for example, be the source which actuates the film mechanism if the system is being used for the transmission of moving pictures. Thus, in a specific adaptation of the invention, there is provided means for generating the vertical and horizontal synchronizing impulses and blanking impulses for eliminating the video signal during synchronization, which impulses bear the proper relation to one another and to a signal from a master source.

The invention further provides important features which may be used in any case where it is desirable to obtain accurately timed impulses originally related with a signal from some source. It also provides features which may likewise be used where it is desirable to obtain accurately timed periodic impulses from a source which may be subject to periodic or random variations in frequency.

By means of the blanking process, the video signal is arbitrarily given a value corresponding to the no-light level of the picture and the synchronizing signals are added to this blanked video signal in such a direction as to cause no light when the composite signal is applied to a picture tube. As may be readily seen, for the duration of the blanking interval no picture can be transmitted. Consequently, it is desirable to make this blanking interval as short as possible and, in general, for horizontal blanking, the time duration of the blanking interval portion should be less than 10 percent of the duration of the horizontal line, and the vertical blanking interval should be not over 10 percent of the total scanning time. During the vertical blanking interval, it is desirable that the horizontal scanning means at the receiver be maintained in synchronism with that at the transmitter. To accomplish this, it is necessary to so transmit the horizontal and vertical synchronizing signals that they do not interfere one with the other. Various means have been proposed by which this may be accomplished, such as that, for example, disclosed in the copending application of Richard L. Campbell for Composite signal system, Serial No. 27,074, filed June 17, 1935, in which the vertical synchronizing pulse is serrated to allow the simultaneous transmission of horizontal synchronizing signals. In that system, the duration of the vertical synchronizing signal pulse may be equal to that of four or five horizontal lines. I have found, however, that satisfactory synchronization can be obtained by using a narrow vertical synchronizing pulse whose duration is less than that of one horizontal line and whose amplitude is greater than that of the horizontal synchronizing signals. An object of my invention is to provide such a system, having certain definite advantages which will be pointed out hereinafter.

Another important feature of the invention is the provision of novel means whereby automatic background control, and consequent automatic control of the brightness of the transmitted picture, may be accurately accomplished. As stated above, it is desirable to transmit the various signals in a television system through the same channel, and it will be noted that in a conventional television system, three or more different signals are usually combined, transmitted and then separated before the individual signals are used. These three signals are, of course, the video or picture signal, the horizontal synchronizing signal, and the vertical synchronizing signal. By means of the present invention, it is possible to combine these various signals to form a composite signal which may be readily transmitted and in which the constituent signals are arranged in a certain manner and in proper relation to an established reference, whereby the signals may be separated readily at the receiving end of the system and the background and brightness of the transmitted picture may be accurately maintained or controlled.

In order to obtain automatic background control, it is necessary to transmit from the camera tube to the picture tube, intelligence concerning the average value of the video signal. In the above-mentioned copending Campbell application, there is disclosed a method of transmitting this intelligence to obtain automatic background or brightness control, which method involves the use of conductively coupled or D. C. amplifiers. It is pointed out in the said Campbell application that the video or picture signal includes a zero frequency component and this component is carried through the system as the said required intelligence by means of the D. C. amplifiers. This method requires relatively large blocking batteries having a relatively high capacity to ground and shunted thereto by relatively high impedances. The capacity to ground provides an effective high frequency cut-off point for any D. C. amplifier, which makes it impossible to transmit a sufficient range of frequencies to adequately amplify a video signal unless expensive precautions are taken. The present invention provides an improved method for obtaining automatic background or brightness control, which method uses in place of the D. C. amplifier a device defined as a D. C. compensated amplifier. This device will be fully described and the advantages thereof pointed out in the subsequent description. The present invention also provides means for obtaining the zero frequency component, which, as above stated, constitutes the background or brightness control medium, directly from the object being televised and without going through the camera tube. In this respect, the present invention is a further improvement over that of the said Campbell application.

The present invention, therefore, comprises three principal or main features, viz., novel means for generating the required synchronizing signals, a novel method of obtaining accurate synchronization by the employment of a narrow vertical synchronizing pulse, and novel means for obtaining automatic background or brightness control, all cooperating with one another to provide an improved television system. Based upon these features, the principal objects of the invention may be stated as follows:

First, to provide a novel system for the generation of precisely timed horizontal and vertical synchronizing signals, as well as the corresponding blanking signals;

Second, to provide a novel method of accurate synchronization involving the use of a narrow vertical synchronizing pulse; and Third, to provide a novel method and means whereby the various signals may be combined in such manner and may be maintained in such relation to an established reference that the signals may be readily separated and used individually at the receiving station, and a characteristic of the composite signal may indicate some medium or condition at the transmitting station and may, accordingly, be employed for control purposes at the receiving station, for example, to control the background and brightness of the transmitted picture.

Other objects and features of the invention will become apparent as the description proceeds. For a clear understanding of the manner in which the objects of the invention are achieved, reference may be had to the accompanying drawings illustrating a preferred embodiment of the invention, it being understood, however, that the specific illustration is for the purpose of disclosure only and places no limitation upon the invention.

In the drawings:

Fig. 2 shows in schematic form a complete television receiver;

Figure 1:
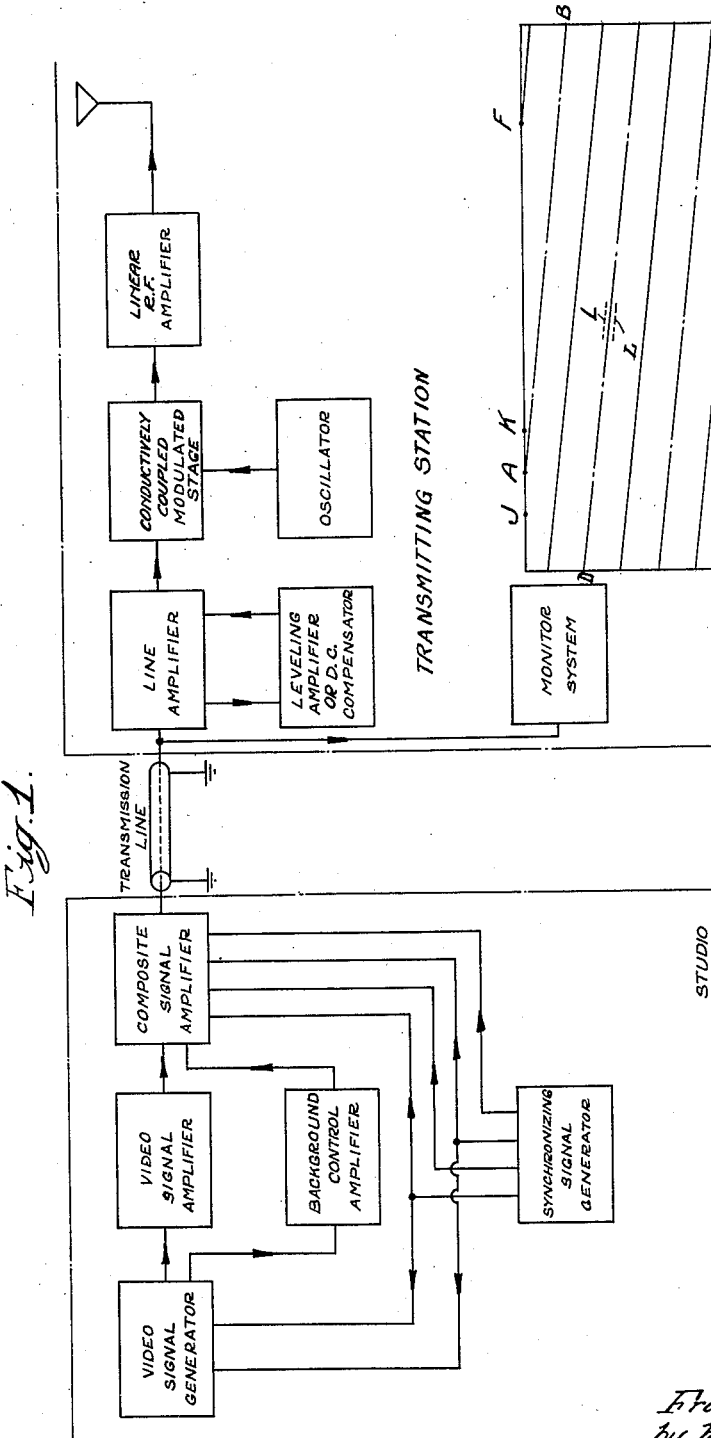
Fig. 1 represents in schematic form a television transmitting system according to my invention including the apparatus at the studio and the apparatus at the transmitting station.
Figure 8:
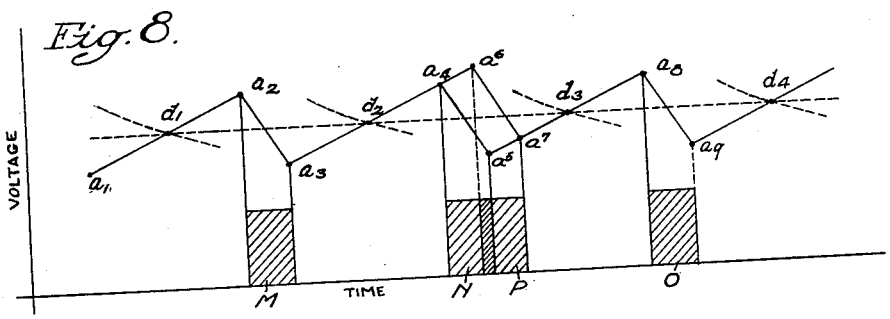
Figure 9:
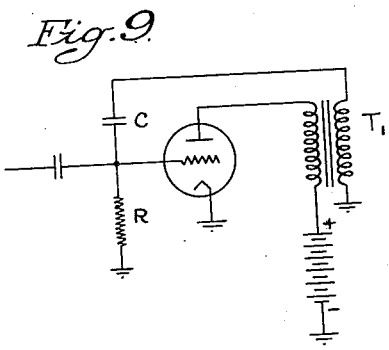
Figure 10:
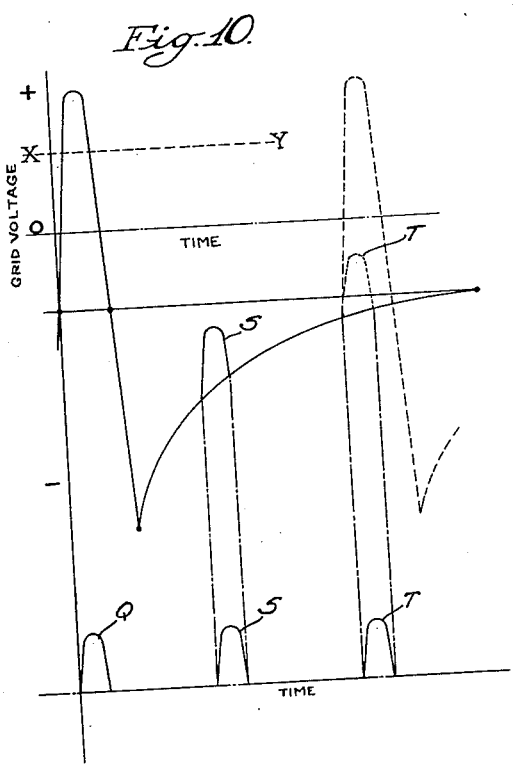
Figure 11:
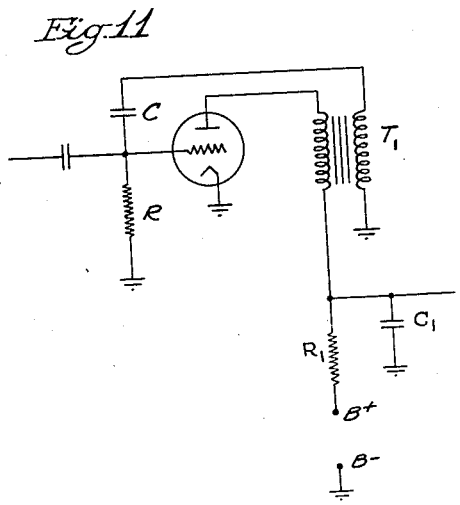
Figure 22A:
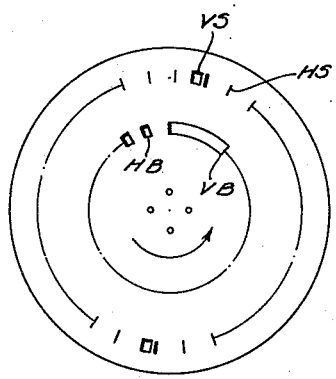
Figure 22:
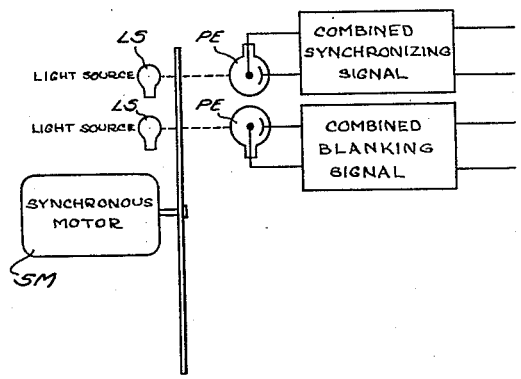
Figure 29:
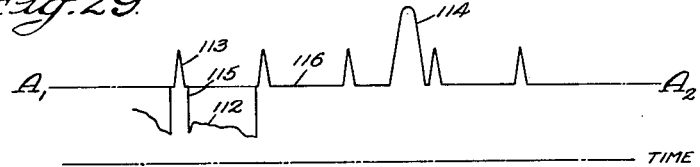
Figure 30:
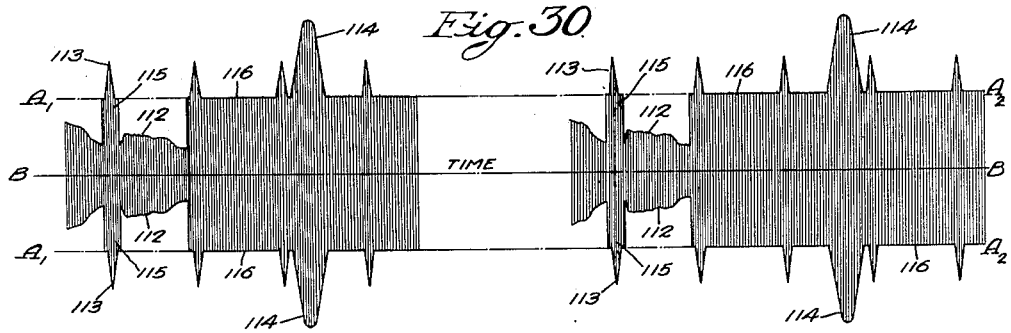
Figure 31:
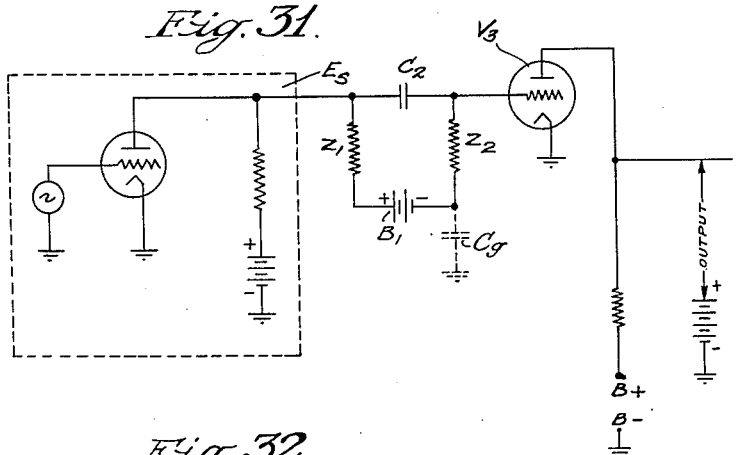
Figure 32:
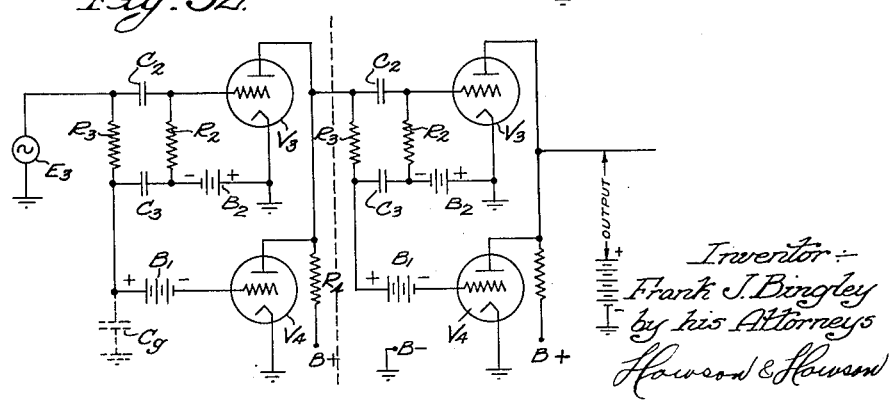
Figure 33:
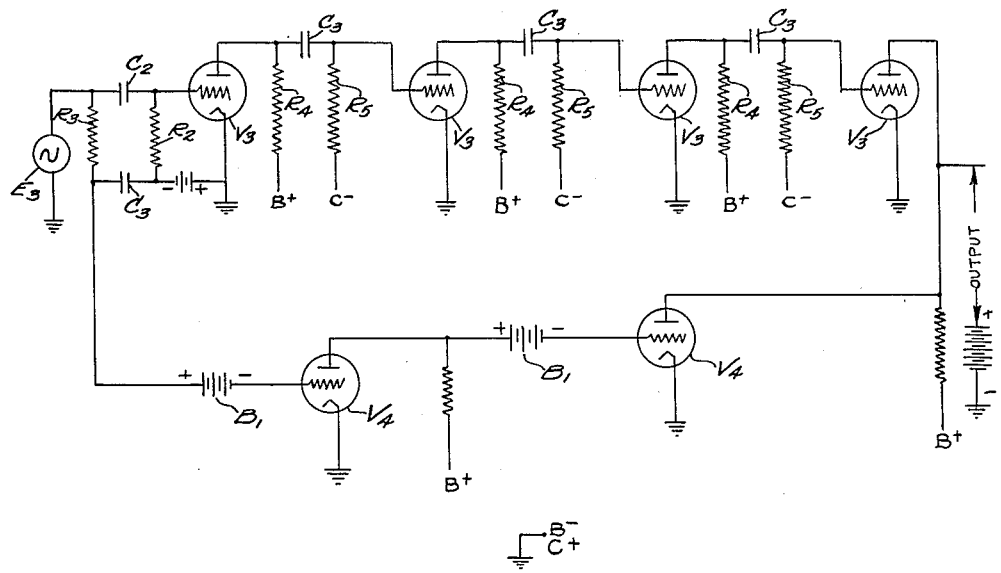
Figure 34:
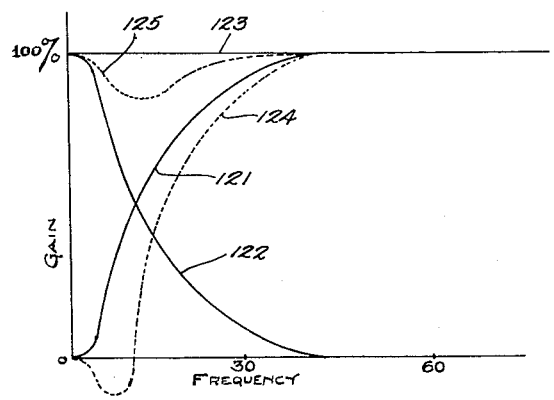

Figs. 4 to 7, inclusive, show various novel methods of combining waves of different wave form to obtain the novel results achieved by the practice of the invention;

Fig. 8 shows the voltages used in a system by which periodic frequency variations in the system may be eliminated;

Figs. 9 and 11 are circuit diagrams of circuits which are used to provide the voltages illustrated in Fig. 8;

Fig. 10 represents the voltages which are obtained in certain parts of the circuits of Figs. 9 and 11;

Fig. 12 is a block diagram showing in greater detail the synchronizing signal generator which forms part of the system of Fig. 1;

Fig. 12a is a detail of a modification of Fig. 12;

Figs. 13 to 21, inclusive, are circuit diagrams of the several units shown schematically in Fig. 12;

Fig. 22 is a diagrammatic representation of electro-optical means by which some of the signals generated electrically by the system of Fig. 12, may be generated mechanically;

Fig. 22a is a face view of the disc employed in this system;

Figs. 23 to 26, inclusive, show certain types of images and the resultant video signals which would be obtained therefrom, and demonstrate the signal necessary to obtain background control;

Figs. 27 and 28 are circuit diagrams of parts of the video signal transmission means;

Fig. 29 shows the wave form of the composite signal obtained by combining the video signal, the background control signal, the blanking signals, and the synchronizing signals;

Fig. 30 represents two portions of a carrier wave modulated with such a composite signal after the manner of the invention;

Figs. 31, 32, and 33 are circuit diagrams of D. C. compensated amplifiers;

Fig. 34 shows the curves of gain versus frequency for various parts of these amplifiers;

Figs. 35, 36, and 37 are circuit diagrams of various parts of the transmitting system; and Fig. 38 is a circuit diagram of that part of the receiver which provides for synchronized scanning.

Referring particularly to Figs. 1 and 2 of the drawings, there is illustrated a complete television system embodying the various features of the invention, the transmitting system or apparatus being illustrated in Fig. 1 and the receiving system or apparatus being illustrated in Fig. 2. The arrow heads indicate the directions of flow of energy between the various units. These illustrations are schematic in form and are intended only to enable a general understanding of the complete system, the details of the system being illustrated in the subsequent figures of the drawings which will be described hereinafter.

Referring to Fig. 1, the transmitting system includes a video signal generator which supplies the video or picture signal to a video signal amplifier and also supplies a zero frequency signal component to a background control amplifier. This zero frequency signal component corresponds to the average intensity of illumination of the object being televised, and it is by means of this signal component, that background control is obtained. The amplified signals are then combined in a composite signal amplifier to obtain a composite signal which, in addition to including the customary video and synchronizing signals, also includes intelligence by which background control may be obtained at the receiver. The horizontal synchronizing signal, the vertical synchronizing signal, and the corresponding blanking signals are supplied to the composite signal amplifier by a synchronizing signal generator which comprises an important feature of the invention, as above mentioned, and which may generate the narrow vertical synchronizing pulses. The horizontal and vertical synchronizing signals are also used respectively to energize the horizontal and vertical scanning means at the video signal generator.

The composite signal is supplied to a transmission line which extends between the studio and the transmitting station. This transmission line is preferably a coaxial line capable of transmitting the necessary frequency band width which is often as great as three megacycles. The output of the transmission line is supplied at the transmitting station to a line amplifier which includes a D. C. compensator and, therefore, serves to amplify not only the A. C. components but also the zero frequency component above mentioned. The composite signal is then transferred to a conductively coupled modulated stage, that is, an amplifier in which the level of the output signal is directly proportional to the intensity of the modulating signal. This amplifier, which is also energized by an oscillator, produces a modulated carrier wave in which the modulation is in accordance with the composite signal. The modulated carrier wave may be supplied directly to a radiating system, but it is preferably amplified first by a linear R. F. power amplifier and then radiated.

The output of the transmission line may also be used to energize a monitor system at the transmitting station. This monitor system may comprise substantially a television receiver which, however, is energized by the composite signal rather than by the modulated carrier wave. The monitor system may, therefore, comprise that portion of the television receiver of Fig. 2 subsequent to the detector and may be coupled to the transmission line by means of a suitable vacuum tube.

Referring now to Fig. 2, the receiving system may comprise an antenna, and a conventional carrier frequency amplifier which may or may not include a detector-oscillator and an intermediate frequency amplifying system, following the conventional superheterodyne practice. In either case, the carrier frequency amplifier will be followed by a linear detector which is energized by a modulated carrier signal and the output of which comprises the composite signal above mentioned. The output of the linear detector may be supplied to a video signal amplifier which includes a D. C. compensator by which the background control may be obtained. The output of this amplifier is supplied directly to the picture tube. Since the zero frequency component, by which the background control is obtained, has been transmitted through the entire system, including the space transmission, automatic background control is obtained at the picture tube. The output of the linear detector or preferably that of the first video frequency amplifier stage is also supplied to a synchronizing signal selector stage which separates the combined synchronizing signals from the video signal. This may conveniently be accomplished by amplitude selection if the separator tube is conductively coupled to the system and if the zero frequency components of the composite signal are transmitted through the system as described above; that is, the selector stage is designed to pass only that portion of the composite signal greater than the no-light level which portion includes only the synchronizing signals.

The output of the selector stage is supplied to two separator stages one of which separates the vertical synchronizing signal and the second the horizontal signal. The vertical synchronizing signal separator may comprise a further amplitude limiting stage which passes only that portion of the combined signal having an amplitude greater than the horizontal synchronizing signal.

The horizontal synchronizing signal separator may comprise a wave shape or frequency selective network and amplifier which discriminates between the abrupt wave front of the horizontal synchronizing pulses and the less abrupt wave front of the vertical synchronizing pulses, permitting the former to pass through substantially unaffected while markedly attenuating and modifying the latter.

Having thus separated the synchronizing signals, each may be applied to a separate scanning signal generator. This generator, in response to the pulse synchronizing signal, forms a signal which may be used with the deflecting coils or deflecting plates of the picture tube or camera tube to obtain the desired scanning motion of the electron beam.

The system as a whole, as illustrated schematically in Figs. 1 and 2, having been described generally, the component systems or parts of the general system, and the essential features of the invention, will now be described. Although the several features are preferably combined in a single system, it will be understood that they may be employed separately and those features which are capable of general application may be so employed.

*The synchronizing signal generator*

This phase or feature of the invention relates specifically to the synchronizing signal generator diagrammatically illustrated as a part of the system of Fig. 1.

In the conventional television system in which interlaced scanning is used, one necessary condition or relation between the several synchronizing signals used to actuate the electron beam deflecting means is that the ratio between the relatively high frequency of one synchronizing signal and the relatively low frequency of the other synchronizing signal must be an integral number plus one half. While the invention is not limited to interlaced scanning, it provides means for obtaining this frequency relation or any other relation desired. The invention provides means for obtaining the higher frequency from the lower frequency by forming a square wave from a sinusoidal wave of the lower frequency, amplifying the odd harmonics of this square wave to obtain a frequency which is twice the frequency of the high frequency synchronizing signal, and then halving the frequency to obtain the high frequency synchronizing signal. It is further necessary, regardless of the type of scanning, that the time or phase relations between the two synchronizing signals be accurately established and precisely maintained. The invention provides means by which these results may be obtained. In general, this is accomplished by first forming an accurately timed high frequency pulse signal from which all periodic variations have been removed, and then using this high frequency signal as a precision time source, selecting low frequency pulses directly related to the high frequency signal. The invention also provides means for obtaining this corrected high frequency signal from a master source.

Figure 3:
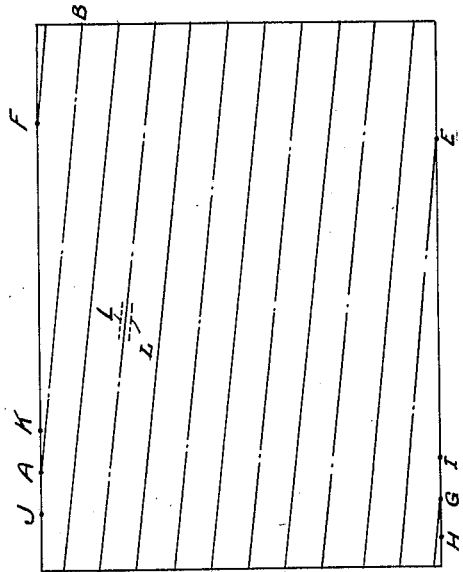
Fig. 3 represents one frame of a television image showing the method of scanning.

For a clear understanding of how the vertical and horizontal synchronizing signals should be co-related, reference may be had to Fig. 3 of the drawings which illustrates the method of interlaced scanning. The scanning beam may start at A and move downward to the right following the dot-and-dash path. At B, the video signal is blanked and the beam is returned to point D from which it again follows the dot-and-dash path eventually traversing all of the dot-and-dash paths and reaching the point E near the bottom right-hand corner of the frame, from which point, it is returned to point F. From F it follows the solid-line path to the point G, thereby producing the interlaced pattern.

In a conventional television system, good definition requires that each frame be subdivided into a large number of lines which are scanned successively by the scanning apparatus. The scanning may be of simple form in which the successive lines follow directly one after another, or it may take the form of interlaced scanning as described. If the scanning beam moves substantially horizontally, as is conventional practice, the horizontal scanning frequency will be considerably higher that the vertical scanning frequency. For good definition, simple interlaced scanning may be employed, in which two interlaced sets of lines constitute a frame. There may be 345 lines to a frame and 30 frames per second. This would require, for interlaced scanning, a vertical scanning signal of 60 pulses per second and a horizontal scanning signal of 10,350 pulses per second. The time required to scan the entire frame once in such case would be of the order of magnitude of 33,300 microseconds, this being the time required for the scanning beam to move from A to G. The time required to scan one horizontal line would be about 97 microseconds. For purposes of illustration, the invention will be described with respect to such a particular system. It will be understood, however, the invention is in no wise to be limited to these particular values but is applicable to other systems.

In practicing the present invention in the particular case above mentioned, three frequencies may be involved, namely, a vertical synchronizing signal frequency of 60 c. p. s., an intermediate frequency of 900 c. p. s., and a frequency of 20.7 k. c. which is twice the horizontal synchronizing frequency. The purpose of the latter two frequencies will be fully understood as the description proceeds. Due to transients and other distortion or modulation in a 60 c. p. s. power line, which may serve as a master source, the duration of the cycles of square waves obtained from such source may vary by say one per cent. This would correspond to a period of 167 microseconds. Likewise, the duration of the cycles of squared waves obtained from an intermediate frequency of 900 c. p. s. derived from said source, might vary by say one per cent which, however, would correspond to only 11 microseconds. As may be observed from Fig. 3, variations in the period of the vertical synchronizing signal will cause the scanning to be terminated at some point between H and I from which it will start again at some point between J and K. If a one percent variation were to occur in the 60 c. p. s. source, this range would cover nearly two lines. Further, the two sets of interlaced scanning lines would move back and forth with respect to each other within some range such as defined by the short broken lines L. Obviously, a variation of one percent in the 60 c. p. s. source would cause intolerable distortion of the picture. On the other hand, the one per cent distortion of the intermediate frequency, which would amount in time to only 11 microseconds, would cause a displacement between H and I of approximately $\frac{1}{10}$ of the line length, which would be a permissible distortion and would cause the lines to vary from their vertical position by only about ten per cent of the distance between adjacent interlaced lines, which is a permissible variation. The present invention, by utilizing the intermediate frequency as a control medium for the vertical synchronizing signal, reduces the distortion to a permissible range, and in fact by this method the variation is limited to less than one per cent of the intermediate frequency.

Regarding the horizontal scanning motion, it will be seen that a variation of 11 microseconds would not be tolerable because the edge of the picture might be ragged to the extent of $\frac{1}{10}$ of the whole picture length. The present invention, however, provides means for making each horizontal line of uniform length by smoothing the intermediate frequency from which the horizontal synchronizing frequency is derived, and thus this variation is eliminated. Thus, it is seen that while it is only necessary to correct the vertical synchronizing frequency within say 11 microseconds, it is necessary to correct more precisely the horizontal synchronizing signal. For this reason, it is permissible to control the vertical synchronizing signals by means of the intermediate frequency, but the horizontal synchronizing signals require a further smoothing operation.

From the above, the necessity for accurate correlation between the synchronizing signals will be appreciated. It will be seen also that by using the intermediate frequency as a controlling medium, the present invention obtains the necessary relation between the signals and eliminates non-permissible distortion of the picture.

As may be seen from above, the invention has to do with frequencies which might be termed perturbed harmonic frequencies, that is harmonic frequencies which may have either a random or periodic frequency variation from their mean value. For the purposes of this specification and claims, harmonic frequencies are defined to include such perturbed harmonic frequencies.

In practicing the invention, pulses of various shapes, frequencies, wave forms, and duration are formed, and to enable a clear understanding of the synchronizing signal generator, the methods of pulse formation will be described first. For purposes of this specification and claims, a pulse signal is defined as that part of the signal wherein the instantaneous signal amplitude deviates from a reference level. The frequency of a pulse signal will be understood to be the number of pulses per unit time, analogous to the frequency of a wave signal which is the number of cycles per unit time. Figs. 4 to 7 illustrate various methods of providing such pulses, which methods may be employed in practicing the invention, as described hereinafter. In Fig. 4, there is illustrated a method of forming periodic pulses of adjustable duration and predetermined frequency. The square wave shape 1 may be obtained from a sinusoidal source using means described hereinafter. If now a second wave 2 of square wave form, similar to the wave 1 but displaced therefrom in time relation, is added to the wave 1, the resulting signal 3 will have the wave shape shown. This signal may be applied to an amplitude-limiting device and the portion below the line 4—4 thus removed. The resulting signal 3a will comprise a series of pulses having the same period as the original signal but whose duration may be determined by the phase relation between the signals 1 and 2. The phase displacement of signals 1 and 2 may be obtained by applying to conventional phase-shifting networks the sinusoidal signals from which the square waves are formed. The signals 1 and 2 may be either added or subtracted, depending upon the relative duration it is desired to obtain in the resulting pulses.

In Figure 5, there is illustrated a method of obtaining signal pulses of one frequency whose timing is controlled by a signal of higher frequency. A sinusoidal wave or signal is shown at 5 and the signal 6 of square wave shape may be derived therefrom. The pulses 7 may be derived from signal 6 and another signal similar thereto but displaced in phase, using the method illustrated in Fig. 4. A sinusoidal signal 8 may be derived from signal 6 or a similar signal by means of a tuned amplifier responsive to some higher harmonic of the signal 5. A signal 9 of square wave form may be obtained from signal 8. Signals 7 and 9 may be added together to obtain the signal 10. This signal may be passed through an amplitude-limiting device to cut off all of the signal below the dotted line 11—11, the resulting signal being shown at 10a. It will be noted that this signal comprises pulses having the same period as signals 5, 6, and 7 but which are accurately timed with respect to the higher harmonic signal 9. There may be a periodic random time variation between signals 7 and 9, that is, the low frequency pulses 7 may vary in position, but this variation would not be transferred to the resulting signal 10a due to the fact that the higher frequency pulse would simply ride back and forth on the top of the low frequency pulse and the variations in the low frequency pulse would not affect it. If desired, instead of using the square wave form 9, the sinusoidal high frequency signal 8 may be combined with signal 7 to obtain the resultant signal 10b, from which the pulses 10c may be obtained, and the duration of signal 7 may be such that one or more high frequency pulses may be transmitted.

In Fig. 6, there is illustrated a method of obtaining pulses of twice the fundamental frequency of a signal, such as the sinusoidal signal 12. This signal may be passed through a device which selects only that portion between the broken lines 13 and 14, the resulting signal being shown at 15. It will be noted that if the portion chosen is not symmetrical with respect to the axis, the resulting signal will consist of half cycles of unequal duration, that is, the positive half cycle will be of different duration than the negative half cycle. A second signal 16, similar to signal 15 but opposite in polarity, may be derived from signal 12 by selecting the portion between the broken lines 13a and 14a, and the two signals 15 and 16 may be added together. In the second signal, the polarity of the longer half cycle must be the same as that of the longer half cycle of the first signal. The resulting signal, shown at 17, will consist of pulses having twice the fundamental frequency and whose duration may be controlled by the portion of the original sine wave which is selected.

In Fig. 7, there is illustrated a method of obtaining low frequency pulses whose duration and time of occurrence are determined by a high frequency signal. In this figure, 18 is a sinusoidal signal corresponding to a higher harmonic of the master signal. A signal 19 having a square wave form may be derived from signal 18. Pulses 20 and 21 occurring at the fundamental frequency may be derived from the original signal by either of the methods illustrated in Figs. 4 and 5. Preferably, signal 21 should start before the occurrence of a high frequency pulse and signal 20 should start before the completion of the same high frequency pulse. Likewise, signal 20 should end during a high frequency pulse and signal 21 should end after the completion of the high frequency pulse. The distinctive feature of signals 20 and 21 is the wave terminations of the signal formed by the combination of pulses 20 and 21. It will be understood that the term "wave termination" is used to indicate the wave form at either the beginning or end of a particular pulse. In the present instance, the two-step wave terminations of the pulse formed by combining pulses 20 and 21 refer to the wave forms of the beginning and the completion of the resultant pulse. In this instance, preferably both of the two-step wave terminations should have steep wave slopes. Obviously, these terminations may be obtained by combining two pulses of unequal duration such as pulses 20 and 21 or by combining two overlapping pulses of substantially equal duration. If signals 19, 20, and 21 are added together, the resulting signal will have the wave shape shown at 22. Of this signal 22, the portion between the broken lines 23 and 24 may be selected, as shown at 24a. It will be noted that the duration of this selected signal is approximately determined by signals 20 and 21, but the exact duration is determined by the signal 19; that is, the signals 20 and 21 may vary somewhat from the position shown but the occurrence and actual duration of the signal 24a is determined by the high frequency signal 19. Thus the function of the intermediate level in the wave terminations of the combination of pulses 20 and 21 is to raise the high frequency pulses resting thereon to the transmission level; and the top level of the combination of pulses 20 and 21 serves to continue transmission during the interval between the high frequency pulses which determine the starting and stopping time of the resultant pulse 24a.

In the above description, idealized rectangular pulse signals have been used for the sake of clarity. It will be understood, of course, that modifications of these idealized wave forms, such as signals of flattened wave form, may be employed without departing from the scope of the invention.

The methods of forming and treating waves in accordance with Figs. 4 to 7 may be performed by any suitable apparatus. The apparatus described hereinafter for this purpose is merely exemplary and it is to be understood, therefore, that the invention contemplates the use of any other apparatus which persons skilled in the art might employ. With respect to the methods disclosed in Figs. 5 and 7 in particular, the method of selection by amplitude limiting means and the apparatus described hereinafter constitute a preferred form of the device. Basically, the invention contemplates the formation of a higher frequency signal, frequency variations of which have been minimized, and then the selection of certain pulses or cycles of this higher frequency signal by lower frequency pulses, which may be subject to variations in time of occurrence or duration, occurring at appropriate intervals, by means which will transmit the higher frequency signal but only during the occurrence of the actuating pulse. Obviously, the actuating pulses need not occur at equally spaced time intervals but may occur at any appropriate times. Further, the higher frequency signal need not be a harmonic of the lower pulse signal frequency, if the actuating pulse signal has a particular frequency, but preferably the two should be approximately related by a ratio of small whole numbers. It will be understood then that while the means, for transmitting certain portions of the higher frequency signal in response to an actuating pulse signal, may take the form of signal-amplitude operated means, other forms of transmission means for obtaining the desired signal selection may be used.

A clear understanding of a further feature of the invention at this point is also desirable to enable a clear conception of the synchronizing signal generator described hereinafter.

The invention further contemplates means for removing from a signal, periodic variations in frequency which may be present in the signal. This is done by providing a voltage which will increase with time at a constant rate, by forming impulses in response to the controlling signal, and then causing each impulse as it occurs to decrease the amplitude of the said voltage, so that a signal having a saw-tooth wave form is obtained. This may better be understood by reference to the voltage curve of Fig. 8, wherein the voltage builds up from $a_1$ to $a_2$ at a constant rate. At time $a_2$, an input signal M partially discharges the system reducing the amplitude of the built-up voltage from $a_2$ to $a_3$. As may be seen from the figure, the amount of discharge will be a function of the time interval between $a_2$ and $a_3$. The voltage then continues to build up to $a_4$ at which time a second signal N again discharges it an equal amount to $a_5$. This cycle is repeated periodically. If now, instead of signal N a signal P, misplaced in time relation with respect to signal N, is applied, the voltage will build up from $a_3$ to $a_6$, instead of from $a_3$ to $a_4$. At $a_6$, the voltage would be discharged an amount equal to the previous amount at $a_7$. However, the line $a_1$, $a_2$ is parallel to line $a_3$, $a_4$ or $a_3$, $a_6$ which, in turn, is parallel to line $a_5$, $a_8$ or $a_7$, $a_8$. Consequently, a straight line parallel to the reference axis intersecting these lines, say at points $d_1$, $d_2$, $d_3$, etc., will be divided into equal portions representing time periods, namely $d_1$, $d_2$, $d_2$, $d_3$, etc. Therefore, if some means, such as a blocking tube oscillator, is synchronized at the voltage level corresponding to $d_1$, $d_2$, $d_3$, etc., its output will consist of periodic impulses occurring at equal intervals even though the input signals M, N, O, and P may have a periodic variation about the mean frequency.

It will be seen that in order to produce the saw-tooth voltage of Fig. 8, some form of oscillator is required which is synchronized by a voltage level. The well-known "blocking-tube oscillator" has such a characteristic. Such an oscillator is shown in Fig. 9 and the wave shape of its grid voltage is illustrated in Fig. 10. A blocking-tube oscillator is simply an extremely overcoupled regenerative oscillator. In its quiescent condition, the grid of the tube is biased beyond cut-off by a voltage in the time circuit RC. This voltage will gradually leak off until the grid voltage is such that the tube is no longer blocked, at which point the plate will start to draw current. The increase in plate current will induce a voltage in the grid circuit by means of the transformer $T_1$ which will increase the grid voltage which, in turn, will cause the plate to draw more current. As a result, the plate current and grid voltage will increase rapidly until saturation occurs. A voltage will be set up in the resistance R due to the rectifying action of the grid when it goes positive, and this voltage will oppose that occurring in the transformer T due to the now lessened positive rate of change of the plate current, thus tending to reduce the increase in plate current. When the rate of change of plate current becomes zero, the voltage in the grid circuit due to the transformer will decrease to zero, thus leaving a relatively large negative voltage on the grid of the tube. This, of course, will reduce the plate current, and the decrease in plate current will induce a further voltage in the grid circuit which will further reduce the grid potential. The plate current will rapidly reduce to zero, after which the only remaining voltage in the grid circuit is that built up across resistance R by the rectifying action of the grid. This voltage is negative with respect to the cathode and sufficiently large to bias the grid beyond cut-off. The tube will remain blocked until this voltage, which is determined by the charge on the condenser and the grid leak, has been reduced sufficiently by leakage to allow the plate to again draw current. It will be seen from Fig. 10 that when most of the charge has leaked off the grid condenser through the grid leak, the rate of decay is substantially linear and the tube may be made to repeat its cycle by applying in the grid circuit a sufficient voltage to cause the grid to become positive with respect to the cut-off point. Consequently, it will be seen that the period of the oscillator is a function of the values assigned to the time circuit RC and also of the level of the signal added to the grid circuit, which level may be defined as the synchronizing level.

It will be noted further that the current in the plate circuit will consist of a relatively short impulse and will then be zero for the rest of the cycle. The amplitude of this impulse is substantially independent of the input signal which functions only to establish the period of the cycle. This follows from the fact that the only requirement of the input signal is that it make the grid more positive than the cut-off voltage, after which the system itself takes over complete control of the input circuit and any reasonable additional input voltages will be negligible by comparison with the voltage generated within the circuit itself.

In Fig. 11 is illustrated a circuit embodying a blocking tube oscillator which may be used to build up the sawtooth wave form shown in Fig. 8 in response to input signals which may have a periodic variations with respect to some mean period. This circuit comprises a blocking tube oscillator having a resistance $R_1$ and a capacitance $C_1$ in its plate circuit. During the quiescent portion of the cycle, the condenser $C_1$ will slowly charge through the resistance $R_1$, and, by suitable adjustment of the time constant of this circuit, the rate of increase in voltage may be made substantially uniform. When the oscillator is triggered, the condenser will be discharged by a certain amount which will be independent of the magnitude of the input signal for the reasons outlined above. Consequently, if such a system is energized by impulses which have a periodic variation with respect to some mean period, the output voltage across the condenser $C_1$ will have a predetermined value at equally spaced time intervals. In other words, the periodic variation has been eliminated. The output of this circuit may be used to supply the synchronizing voltage for a second blocking tube oscillator which will form accurately timed periodic impulses.

It will be noted from Fig. 10 that the voltage necessary to start or trigger the blocking tube oscillator varies with time. In other words, the synchronizing level is to a certain extent a function of time and consequently in Fig. 8 this level has been shown by the dotted lines through the points $d_1$, $d_2$, $d_3$, $d_4$, etc. By proper adjustment of the circuit constants, the oscillator may be made to synchronize only when the voltage is building up. It will be understood that the form shown in Fig. 8 is exaggerated to delineate more clearly the theory of the device; in actual practice the duration of the pulses M, N, O, and P would be considerably smaller as compared with their period, and the periodic variation in frequency would be less.

Other details of Fig. 10 serve to illustrate the action of the device of Fig. 17 and are described in connection with the explanation of that figure.

The above-described signal generation methods and the practical application thereof may be more clearly understood by reference to the synchronizing and blanking signal generating system used in a television transmitter Such a system requires synchronizing signals for the horizontal and vertical scanning means and corresponding blanking signals, which signals are incorporated in the signal sent out by the transmitter In a particular system, such as above mentioned a vertical synchronizing signal consisting of pulses of brief duration and occurring with a frequency of 60 c. p. s. may be used for vertical scanning; similar pulses occurring coincidentally with the vertical synchronizing pulses but of somewhat greater duration being used for vertical blanking signals. Similar pulses having a frequency of 10.35 k. c. may be used for horizontal synchronizing, and coincident pulses of somewhat greater duration may be used for horizontal blanking signals. It will be seen particularly from Fig. 3 and the above discussion relative thereto, that such a system must be closely inter-related; that is, the relation between the vertical and horizontal synchronizing signals should be precisely established and accurately maintained to prevent distortion of the transmitted picture. Likewise, both synchronizing signals must be related to the master source which might be the 60 c. p. s. current used to drive other mechanism used elsewhere in the system. Due to the fact that the high frequency horizontal synchronizing and blanking signals are obtained from the low frequency source by means of tuned frequency multiplying devices, a certain amount of what might be designated electrical "back lash" will occur in the system; that is to say, the tuned circuits cannot be made directly responsive to rapid random variations which may occur in the various parts of the system, owing to the time required for the decay of transients in the various oscillatory circuits. These difficulties with "back lash" and similar difficulties may be avoided by using the methods outlined above for accurately timing low frequency pulses with high frequency signals, without using tuned circuits or other circuits, which might introduce transients of one form or another, as an intermediate step. The synchronizing signal generating system described below utilizes also the method outlined above for eliminating periodic variations in the frequency of the control voltage which arise, for example, by virtue of the fact that in selecting harmonics of the low frequency controlling signal, it is impossible to discriminate completely against undesirable amplitude and phase modulation which is inevitably transferred through the system to a certain extent.

In Fig. 12 there is shown schematically a synchronizing signal generating system which may be used to supply the horizontal and vertical synchronizing and blanking signals, the various signals occurring at different parts of the system being illustrated. The system may receive a 60 c. p. s. controlling signal, and in operation it distorts that signal so as to enhance the odd harmonics, selects an odd higher harmonic to obtain an intermediate frequency, smoothes that frequency and then distorts that frequency wave so as to augment its harmonics, and again selects one of the odd higher harmonics to obtain a signal having twice the frequency of the desired horizontal synchronizing signal. If desired more than one intermediate frequency may be used and the higher frequency derived from the lower by use of several intermediate stages. This derived signal is smoothed and modified so as to remove periodic variations, and is then applied to a frequency halving circuit to give the required horizontal synchronizing signal. The frequency of the vertical synchronizing signal may be the same as that of the master source. It will be noted that by selecting only odd harmonics and then dividing the frequency obtained in that way, the resulting horizontal synchronizing signal frequency is equal to an integral number plus one-half the vertical synchronizing signal frequency, which is the necessary condition for interlaced scanning, as above mentioned. The timing of the vertical synchronizing signal is roughly controlled by the signal from the master source and accurately determined by the above-mentioned smoothed intermediate frequency. If desired, however, either the horizontal synchronizing signal in certain cases or the signal having twice the frequency thereof, could be used to determine the precise timing of the vertical synchronizing signal. It has been found, however, that sufficient accuracy may be obtained by using the said intermediate frequency signal.

Referring now to Fig. 12, unit #1 is a tuned buffer and phase-shifting system, which may be energized by a 60 c. p. s. source, which source may also actuate other mechanism associated with the transmitter. Such other mechanism, which might, for example, be a synchronous motor to drive a cinema film projector, is shown as unit #1b. The phase-shifting system may be provided to adjust the timing of the several synchronizing and blanking signals with respect to the other equipment. The unit #1 may include a tuned amplifier to smooth the 60 c. p. s. signal and to eliminate to a large extent undesirable variations in the wave form of the voltage obtained from the commercial power lines to which this unit may be connected. The output of this unit may comprise a bi-phase source of smoothed 60 c. p. s. signals whose phase with respect to the supply or master source may be controlled. For purposes of this specification, a bi-phase source may be defined as one which supplies two signals each of which is equal in magnitude but opposite in phase with respect to the other. One phase of the bi-phase output may be applied to a unit #2a comprising a wave shaper which forms, from the sinusoidal signal, a signal of corresponding frequency having a square wave shape. This signal is applied to unit #3 which includes an amplifier tuned to a high harmonic, such as the 15th. This amplifier consequently produces a 900 c. p. s. signal having a sinusoidal wave shape, which signal may be rendered of square wave form and applied to unit #4 wherein the 23rd harmonic of the intermediate frequency is selected, producing a resulting signal having a frequency of 20.7 k. c. This 20.7 k. c. signal may be applied to unit #5 which comprises a device for eliminating any periodic variations in frequency that may occur in the signal and for producing a signal having one-half that frequency, that is 10.35 k. c. The output of unit #5 comprises a bi-phase source of pulses having a relatively brief duration and occurring periodically with the frequency desired for the horizontal synchronizing signal. The horizontal signals may be obtained from one side of the bi-phase output which also may supply signals to unit #6 which forms horizontal blanking signals therefrom. Signals of opposite polarity are obtained from unit #5 to energize unit #8.

The bi-phase signals from unit #1 may also be applied to unit #2b, which modifies and adds the two modified bi-phase signals to a signal derived from unit #3, the intermediate frequency amplifier, to form pulses occurring at the fundamental frequency but timed with respect to the intermediate frequency, thus giving the desired vertical synchronizing signals.

As stated above, a narrow vertical synchronizing signal pulse having a duration less than one half cycle of the horizontal synchronizing frequency, for the case of interlaced scanning, offers certain advantages over a vertical synchronizing signal of longer duration.

The system of Fig. 12 has been adapted to produce the narrow vertical synchronizing pulse by the addition of the unit #7 which consists of a narrow-impulse generator and which may be inserted between unit #3 and unit #2b. If it is not desired to use the narrow vertical pulses, unit #7 may be omitted, as shown in Fig. 12a. This device, which will be fully described later, functions to form a narrow impulse from an input signal which comprises a 900 c. p. s sinusoidal signal. In other words, the vertical impulse selector unit #2b may be energized by a narrow pulse having a frequency of 900 c. p. s. rather than by a sinusoidal signal.

The vertical synchronizing signals may be applied to unit #8 which may likewise be energized by the horizontal synchronizing signals to form a modified vertical synchronizing signal, or serrated signal, as described in the aforementioned Campbell application.

Unit #9 which is adapted to form the vertical blanking signal, is likewise energized by units #1 and #3. It is further convenient to interrelate unit #2b, which forms the vertical synchronizing pulses, with unit #9 to directly relate the vertical synchronizing and blanking signals, and to reduce the amount of apparatus necessary.

The various units shown in block form in Fig. 12 are illustrated in detail in Figs. 13 to 21 inclusive. The circuit diagrams, which are in part self-explanatory, of these units, obviates the necessity of describing them in great detail. To some extent, the operation of these devices will be obvious and for the sake of simplicity, only those features requiring detailed discussion will be so described. In Fig. 13, there is shown a circuit which may be used to perform the functions of unit #1. It comprises a vacuum tube amplifier 25 having a tuned load circuit 26. This circuit may be tuned to 60 c. p. s. for this particular case. The anode of tube 25 is likewise connected to ground through a network 27 comprising an inductance, a resistance and a condenser, by means of which the phase of the output may be shifted with respect to the phase of the input. The signal derived from this last named impedance network may be applied to a second amplifier 28, which has a transformer 29 with a center tapped secondary in its load circuit. The center tap of the transformer may be grounded and the extremities of the secondary may be used to form a bi-phase 60 c. p. s. signal source.

In Fig. 14, there is shown the unit #2a which comprises a wave-shaping mechanism by which a square wave may be obtained from the output of the unit #1 of Fig. 12. Unit #2a comprises a vacuum tube 30 whose grid is energized from one side of the bi-phase output of unit #1 through a resistance 31. The amplitude of the input signal may be considerably greater than the range of operating grid voltage so that the grid becomes positive with respect to the cathode soon after the input signal becomes positive. Conventional resistance-capacitance coupling to the next tube 32 is used, with the exception that tube 32 likewise has a resistance 33 in series in its grid circuit. The cathodes of the two tubes may be connected together and to a common ground through a grid biasing resistor 34 and bypass condenser 35. Since the current in the two tubes is 180° out of phase, the size of the bypass condenser 35 may be made materially smaller than that which would ordinarily be used. It will be noted that when the input voltage to the grid of tube 30 becomes positive with respect to its cathode, the grid will draw current, and the resulting voltage drop in resistor 31 will act to flatten off the top of the sinusoidal input signal applied to the grid, thus partially forming the desired square wave. The other portion of the cycle may be flattened by means of the similar resistance 33 in the grid circuit of the second tube. It will be understood of course, that the signal applied to the second tube is reversed in phase as compared with that applied to the first tube. A grid biasing source may be applied to the grid leak of tube 32. The output of the device will then comprise a square wave having the same frequency as that of the sinusoidal input signal. By proper design of the cathode resistance and filter condenser, the unit may be balanced to give the desired symmetrical square topped waves.

In Fig. 15 is shown the unit #2b which is used to select a vertical pulse. The input to this device comprises a bi-phase 60 c. p. s. signal from unit #1 and a 900 c. p. s. signal from unit #3. One phase of the bi-phase 60 c. p. s. signal is applied to tube 36 through a phase-shifting network 37, while the other phase is applied to tube 38 through the phase-shifting network 39. These networks 37 and 39 may each comprise a capacitance and a variable resistance, the ratio of the impedance of the condenser to the resistance being different in the two instances. It will be understood, of course, that other phase-shifting networks might be used. A resistance 40 is connected in series with the grid of tube 36, and a resistance 41 is connected in series with the grid of the tube 38, these resistors serving to limit the amplitude of the input signal as described above in connection with Fig. 14. Resistance 40 should preferably be large as compared with that of the network 37, and the resistance 41 should likewise be large as compared with that of the network 39. The outputs of tubes 36 and 38 are applied to further amplitude-limiting tubes 42 and 43, following the same general system as shown in Fig. 14. The outputs of the two tubes 42 and 43 are combined by connecting the anodes of the tubes to the common load circuit 44. Thus it will be seen that the phases of the bi-phase input signal are modified with respect to each other, that square waves are formed from each of these phase-shifted signals, and that these resulting square waves are added together to form a narrow pulse, following the method illustrated in Fig. 4. The duration of the output pulse is roughly determined by the relative adjustment of phase between the two input signals. The precise timing of the impulse is obtained, however, from the 900 c. p. s. signal, which is applied to the input of the tube 45, the output of which is likewise connected to the common load circuit 44. The common output of the three circuits is passed through the amplitude-limiting device 46, which comprises a vacuum tube whose input circuit is biased below cut-off so that a signal will be transferred only when a positive 60 c. p. s. pulse from tubes 42 and 43 occurs simultaneously with a portion of a cycle of the 900 c. p. s. signal from tube 45. The voltages and method are similar to those illustrated in Fig. 5, the low frequency pulses from tubes 42 and 43 being added to the high frequency sinusoidal signal from tube 45, in the same manner that the pulses 7 of Fig. 5 are added to the sinusoidal signal 8.

The unit #3 which comprises a harmonic selector is shown in Fig. 16. This circuit is energized by the 60 c. p. s. square wave from the wave-shaping unit #2a. A Fourier harmonic analysis would indicate that this square wave is made up of components having the fundamental and odd harmonics only of the fundamental frequency, the amplitude of the harmonics being inversely proportional to their order. It will be seen that in order to select a signal having the desired harmonic frequency, a selector which would pass that frequency and reject all others, would be desirable. However, due to the fact that all filters inherently have a certain resistive component in their impedance, they will pass all of the harmonics to a limited extent. Consequently, while the output of such a filter might comprise very largely the desired harmonic, traces of the other components would be present, and it is desirable to eliminate them. The filter comprises a tuned circuit having a high "Q", placed in the load circuit of a vacuum tube amplifier. It may also be considered that the tuned circuit is shock excited at the applied frequency. It will then oscillate at its fundamental frequency, which will correspond to some odd harmonic of the input signal, and will produce damped wave trains due to the presence of the resistive component. It has been found that by regenerating such a tuned amplifier to just about the point at which the circuit will have self-sustained oscillations, the output may be made to comprise principally the desired harmonic. In other words, by this method of regeneration, the average resistance of the circuit is reduced to nearly zero. It should also be noted that as the resistance is reduced the degree with which the output keeps in phase with the desired harmonic of the input signal is also reduced. Consequently, it is desirable that regeneration be so adjusted as to leave sufficient resistance in the circuit that the output will follow the input but not be responsive to sudden variations in the input. Thus a substantial degree of smoothing is effected.

In a practical application of the device, as shown in Fig. 16, it has been found desirable to supply the input square wave signal to a tube 47 having a tuned circuit 48 in its output circuit. The output of this stage is applied to a similar stage comprising a tube 49 and a tuned circuit 50. Regeneration preferably may be obtained by electromagnetically coupling the inductances of the circuits 48 and 50, as indicated by the dotted line, although it will be understood, of course, that regeneration might be obtained by other methods. Preferably, four stages of amplification may be used with the over-all gain reduced by selecting only a portion of the output of each stage for subsequent amplification. The output of this harmonic selector may be applied to a square wave-shaper similar to unit #2a as shown in Fig. 14.

It will be understood, therefore, that the unit #3 will comprise the harmonic selector of Fig. 16 and a wave-shaping device such as the unit #2a. The unit #4 may be similar to unit #3 except that it does not include a wave-shaping circuit. It is tuned to the higher frequency, i. e., 20.7 k. c. and fewer stages may be necessary due to use of additional smoothing means.

The unit #5 which comprises a frequency halver and smoother is shown in Fig. 17. The input to this device is a sinusoidal signal having a frequency of 20.7 k. c., while the output consists of bi-phase pulses of relatively short duration and having a frequency of 10.35 k. c. In addition to dividing the frequency, the device also serves to remove any periodic variations in frequency which may occur in the input signal. This unit may comprise a plurality of blocking tube oscillators, such as shown in Figs. 9 and 11. The input signal from unit #4 is applied to the grid of a blocking tube oscillator stage which consists of a vacuum tube 51, a transformer 52 in the load circuit of the tube, and a plate circuit time circuit comprising a resistance 53 and condenser 54. The output of this tube is fed back to its grid circuit by means of the secondary of the transformer 52 and the grid condenser 55 and resistance 56. When the grid of the tube 51 is triggered, the plate current will rapidly increase to saturation and then decrease, and the usual blocking voltage will be built up across the resistance 56, as described heretofore. In addition, the current pulse in the anode circuit will discharge the condenser 54, and then during the quiescent period, this condenser will slowly charge through the resistance 53 which may be made variable to provide ajustment of the rate of charge. An additional resistance 53a may be provided in the anode circuit to limit the discharge of condenser 54 and to make the amount of discharge dependent in part upon the potential across the condenser. I have found that the use of such an element, while not markedly effecting the integrating or averaging ability of the system, does improve its frequency stability or its ability to respond to frequencies other than that to which it is adjusted. Preferably the output of this device, which is the voltage across the condenser 54, may be applied to a second device comprising the vacuum tube 57, the transformer 58 and the time circuit 59, which device functions in the same manner as the previous stage and is triggered when the voltage across the condenser 54 is equal to the synchronizing level of the second oscillator. Thus, there is provided means for building up a voltage at substantially constant rate, discharging this built-up voltage in response to a triggering signal, and energizing a subsequent stage by a level of the formed signal, and by means of this arrangement periodic variations in frequency of the input signal may, to a large extent, be minimized. The output of the second stage may be taken from the load circuit, or preferably from the grid circuit as shown, and supplied to an amplitude-limiting device 60 which is biased beyond plate current cut-off, or otherwise serves to cut off all of the voltage below the dotted line XY in Fig. 10, which illustrates the wave form of the voltage in the grid circuit of this stage.

The output of the amplitude-limiting device 60 may be supplied to an additional blocking tube oscillator stage 61. This stage is adjusted to oscillate with about twice the period or half the frequency of the preceding stage. Thus, this stage is triggered by every other pulse from the preceding stage, the unused pulse being insufficient in amplitude to cause energization. This action is shown in Fig. 10 in which the oscillator is triggered by pulses Q and T but not by pulse S. As may be seen from Fig. 10, the pulse voltage S when added to the voltage in the input circuit is not sufficient to unblock the tube whereas the following pulse T, of the same magnitude as S is sufficient due to the fact that more of the voltage in the grid circuit has leaked off. Thus, the stage 61 constitutes a frequency dividing circuit and, in this instance, halves the frequency. Obviously the order of the stages is interchangeable; that is, the frequency could be first halved and then smoothed or vice versa.

It will be noted that the output of the amplitude-limiting stage 60 is taken across a resistance 62 in the cathode circuit of the tube rather than in the anode circuit. By the use of such an arrangement, the proper phase relation is obtained without the use of an additional tube. The portion of the signal transferred may be determined by the magnitude of "C" bias on this tube and this is also true of the second amplitude-limiting stage 63. Here again an output signal is taken from across the cathode resistor 64 while another signal is taken from the anode load circuit 65. By this arrangement, a bi-phase source of signal is obtained. Thus, it will be seen that if the input of unit #5 is energized by a signal having a frequency of 20.7 k. c., which frequency is, however, subject to periodic variations about the means value, the output will comprise a bi-phase source of pulse signals, having a frequency of 10.35 k. c. from which the periodic variations have been substantially eliminated.

The blanking signal generator unit #6 is shown in detail in Fig. 18. The input signal from unit #5 comprises pulses of brief duration having a frequency of 10.35 k. c. and the desired output comprises pulses which may start concurrently with the input pulses but which are of somewhat longer duration. These are obtained by applying the input pulses to a tuned amplifier 66 from which is obtained a 10.35 k. c. sinusoidal signal. This signal is further amplified in a second tuned amplifier 67 whose output load circuit 68 is arranged to provide a bi-phase signal source. Signals from this source are applied to phase-shifting networks 69 and 70, and to amplitude-limiting devices 71 and 72, by which square waves are formed in substantially the same manner as in the device of Fig. 15. The waves are formed and combined according to the method shown in Fig. 4 by which pulses of predetermined duration may be obtained. In the particular circuit used, the duration of the pulses may be determined by the adjustment of the phase-shifting networks 69 and 70, and their time relation to the horizontal synchronizing signals may be established by adjustment of the resonant frequency of the tuned circuits.

The vertical serrating unit #8 comprises a device for modifying the vertical synchronizing pulses so that the horizontal synchronizing signal pulses may be combined with them in such manner that the combined signals may be separated and used each for its own individual purpose without mutual interference at some later part of the system. This unit may be the same as that disclosed in the said Campbell application, in which case it would be energized by pulses having the vertical synchronizing frequency and pulses having the horizontal synchronizing frequency, from which pulses having twice the horizontal synchronizing frequency may be derived and added to the vertical synchronizing pulses, the composite signal being passed through an amplitude-limiting device to produce the serrated signal. It will be noted that the twice-horizontal-frequency signals may be obtained directly from unit #5 if desired.

In Fig. 19, there is shown a specific novel form which the unit #8 may take. This device comprises essentially means for deriving double-frequency sharp pulses directly from the horizontal synchornizing frequency signal. Horizontal synchronizing signals from unit #5 are applied to the amplifier 73 and are used to energize the tuned circuit 74 which is tuned to the horizontal signal frequency. The output is a substantially sinusoidal signal which is further amplified by amplifier 75 and energizes a second tuned circuit 76 likewise tuned to the horizontal signal frequency. It will be noted that the "B" supply is connected to the center tap of the inductance of the tuned circuit 76. Consequently, the terminals of the tuned circuit may be used as a bi-phase signal source, the input signals applied respectively to tubes 77 and 78 being exactly 180° out of phase. In previously described circuits, bi-phase signals have been applied to phase-shifting networks to obtain two signals not exactly 180° out of phase, and by forming square waves from these two signals and then adding the square waves, there have been obtained sharp pulses having a frequency corresponding to that of the applied signals. In this case, however, the 180° phase relation between the two signals is maintained by using identical impedance networks. The voltage relations used to obtain double fresuency pulses are shown in Fig. 6. Referring to that figure, a rectangular wave signal 16 is obtained from a sinusoidal signal 12 by shaping the wave asymmetrically to form a flat topped wave. This may be done by selecting that portion of the sinusoidal signal between the voltage levels 13a and 14a. It will be noted that the upper portion of this selected signal is of longer duration than the lower portion. Likewise a similar signal 15 is obtained from the same sinusoidal signal as previously described. Signal 15 differs from signal 16 in that, in general, it is of opposite polarity and its shorter cycle occurs concurrently with the longer one of 16. The two may then be added together producing a signal 17. It will be noted that signals 15 and 16 cancel except for the short interval, occurring periodically at twice the frequency of signal 12, when the upper portion of each cycle of each signal overruns the corresponding portion of the other. During this interval the signals add and the narrow impulse is produced.

The square-wave shaping circuits comprising tubes 77 and 79, and tubes 78 and 80, are substantially the same as described hereinbefore. It will be noted that, as before, the two cathodes of the two stages of each square wave-shaping circuit are connected together and have a common biasing resistor and filter condenser. As noted before, the space current in each of the two tubes is almost exactly 180° out of phase. Since the resultant wave shapes are nearly rectangular, the current through the biasing resistor will be nearly constant, and, therefore, the filter condenser may be small. In order to obtain the desired asymmetrical wave train in each of the circuits, it is necessary to select an operating point for the grid circuits of the tubes such that the sinusoidal input will pass through the tubes nonasymmetrically. It will be noted that the first tube will cut off part of the positive portion of the wave cycle. Due to the coupling condenser, which filters out the D. C. component, the axis of the modified wave is lowered, and the second amplitude-limiting stage will then cut off a different part of the negative portion of the original wave cycle. Thus, the asymmetrical wave cycles may be obtained by proper design of the common grid biasing resistor and filter condenser for the two tubes and by use of non-conductive coupling between stages. The grid voltages of the tubes of the two branch circuits may each be displaced by the same amount from the symmetrical point. There will then appear in the outputs of these two branches, two waves, in each of which the positive portion of each cycle is of different duration than the negative portion, and the two waves will be generally of opposite polarity and equal amplitude. When added together, as shown in Fig. 6, they will produce narrow pulses of twice the input frequency, the duration of the pulses being determined by the difference in duration between the positive and negative portions of each cycle. In Fig. 19, this addition takes place by virtue of the common load resistance 81 for the tubes 79 and 80. The vertical pulse from unit #2b may be added at the same time by means of tube 82, the resultant wave being shown at 83. The common output of these three circuits is then passed through the amplitude-limiting device 84 which functions to cut off the portion of the serrated wave 83 below the dotted line, thus providing a serrated vertical synchronizing pulse, as in the said Campbell application.

Figure 20:
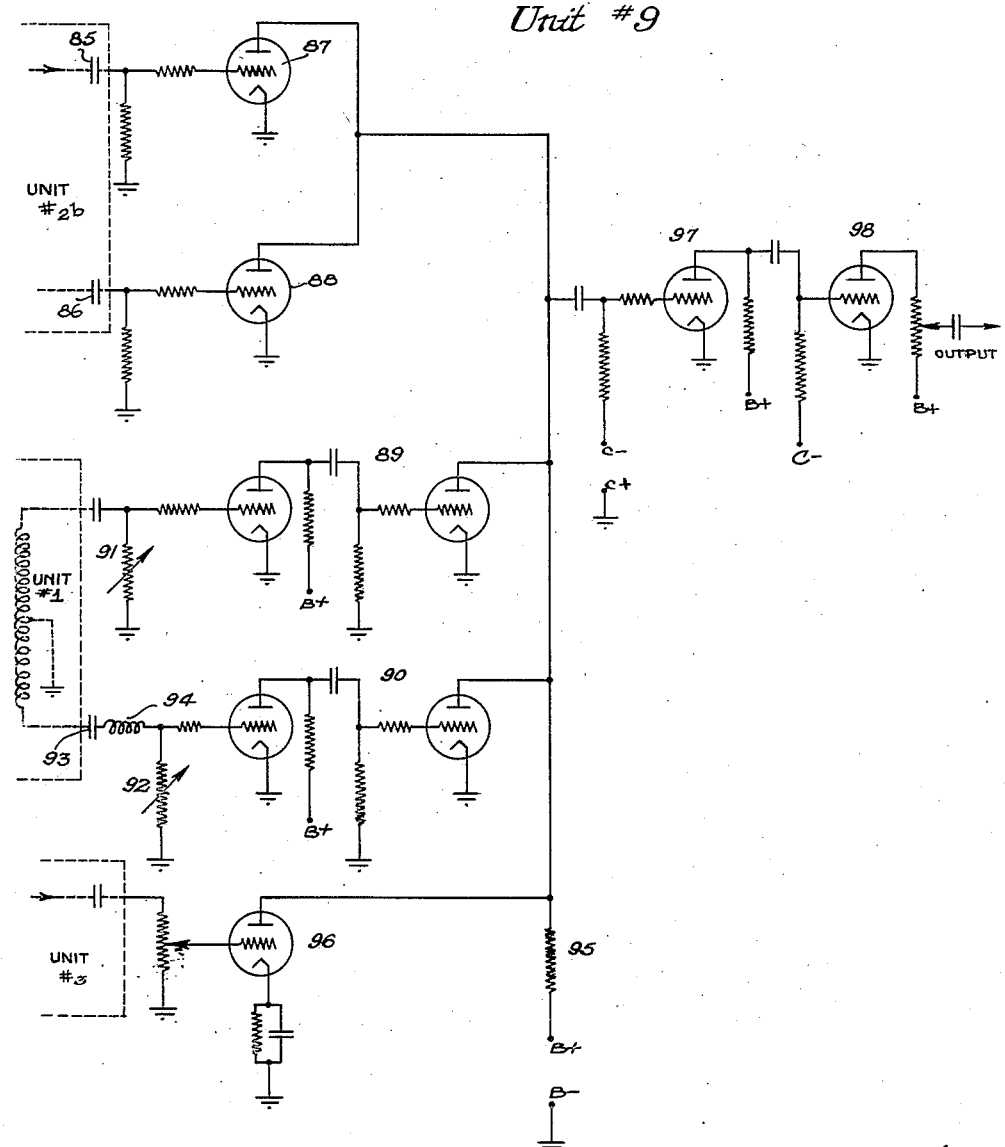

The vertical blanking unit #9 is shown in detail in Fig. 20. It is energized by signals consisting of partially squared waves derived from unit #2b, and also by the bi-phase signal having a frequency of 60 c. p. s. from unit #1, and further by a 900 c. p. s. square wave signal from unit #3. These signals are modified and combined in accordance with the method shown in Fig. 7. Referring for the moment to Fig. 15, it will be remembered that the tubes 36 and 38 are energized through phase-shifting networks from the bi-phase 60 c. p. s. signal from unit #1, and that these tubes function as amplitude-limiting devices to flatten one side of each cycle of these signals. The outputs of these tubes may be applied via leads 85 and 86 to two amplitude-limiting devices 87 and 88 of unit #9 which serve to complete the process of forming a square wave from the sinusoidal signal input. The anodes of tubes 87 and 88 are connected to a common output circuit, and the resultant output signal is the combination of the two square waves which are displaced, so as to form pulses as shown in Fig. 4. Similar pulses are formed by means of the square wave-shaping circuits 89 and 90 which are energized by the bi-phase 60 c. p. s. sinusoidal signal from unit #1 through the phase-shifting networks 91 and 92. In the network 92, the condenser 93 serves as a blocking condenser and its impedance at 60 c. p. s. may be small as compared with that of the inductance 94. The outputs of the two square wave-shaping circuits 89 and 90 are applied to the same common load circuit 95 to which tubes 87 and 88 are connected. A 900 cycle square wave signal from unit #3 is likewise added by means of the vacuum tube 96 which also has its plate connected to the load circuit 95. Thus it will be seen that the combined output voltage will have a form similar to the signal 22 in Fig. 7. By selecting the portion between the lines 23 and 24 of Fig. 7 by means of the amplitude-limiting amplifiers 97 and 98 of Fig. 20, a pulse occurring with a frequency of 60 c. p. s., and whose duration and occurrence is accurately controlled by the 900 c. p. s. signal is obtained.

Thus it will be seen that from the initial 60 c. p. s. source there is obtained an intermediate frequency signal of 900 c. p. s., and from this signal there are obtained horizontal synchronizing and blanking pulse signals whose frequency is fixed by the intermediate frequency and from which the periodic variations occurring in the intermediate frequency have been removed. There are further obtained the desired low frequency synchronizing and blanking pulse signals having the desired frequency and accurately timed with respect to the intermediate frequency, without recourse to inter-connections which would include oscillatory circuits or other circuits which might cause transitory variations. It will be understood, however, that it is not necessary to use all of the features of the invention in combination. Various units of the system could be replaced by other elements, for example, it is easy to obtain a light chopper disk having holes of equal area by means of which synchronizing signals might be obtained. It is difficult, however, to space said holes with a high degree of precision, and, therefore, the unit #5 which comprises a system for eliminating periodic frequency variations might advantageously be used with such a disk. Likewise, other elements of the system might be replaced by other means for obtaining the same result.

In the above description only preferred forms of the invention have been described. It will be understood that modifications of the various wave forms disclosed may be used. In general, wave shapes having steep terminations, such as those disclosed, are preferable but other terminations may be used without departing from the invention.

*Method of generating narrow vertical synchronizing pulses*

The generation and use of the narrow vertical synchronizing pulse may be optionally employed in connection with the synchronizing signal generator, as above noted. This method involves the use of the narrow impulse generator unit #7 which is shown in detail in Fig. 21.

This device is energized by 900 c. p. s. sinusoidal signals from unit #3 and its output comprises narrow pulses having a frequency of 900 c. p. s. formed according to the method of Fig. 4. The two signals employed in this method are obtained from the tube 99 and are passed through square wave-shaping circuits including phase-shifting means and combining amplifiers, designated generally 100 and 101.

The by-phase source is obtained by use of a cathode and anode load system shown in the diagram. For optimum conditions the grid return of tube 99 should have a positive bias with respect to ground and this may be obtained by the bleeder resistor system shown.

The signals 1 and 2 of Fig. 4 which are thus obtained are combined to obtain the resultant signal 3 of Fig. 4. This signal may be used to energize the tube 45 of unit #2b, the vertical impulse selector shown in Fig. 15, instead of the sinusoidal 900 c. p. s. signal mentioned heretofore. Thus, in unit #2b, using the narrow impulse generator, the signals are combined as shown in Fig. 5 except that instead of adding 900 c. p. s. pulses 7, 900 cycle narrow impulses from unit #7 are added. Consequently, the unit #2b selects narrow impulses, timed by the intermediate frequency source and occurring at the rate of 60 c. p. s. By adjustment of the phase-shifting networks of unit #7 the duration of the pulses may be as small as desired; in this case somewhat less than one-half the period of one line.

Broadly the method of the invention contemplates the provision of two synchronizing signals which may be combined, transmitted as a combined signal, and then used to synchronize separate means without interfering with the continuity of operation of these means. As shown in Figs. 29 and 30 and described in detail hereinafter, the synchronizing signals, which comprise pulses of brief duration, are positioned on one side of a voltage level $A_1$—$A_2$ which level is established at the transmitter and reproduced at the receiver. By virtue of this transmittable reference, if desired, the synchronizing signals may be separated from the video by amplitude selection. Furthermore, one synchronizing signal may be separated from the other by removing the other by amplitude selection. A preferred form of this method contemplates the use of a narrow vertical synchronizing pulse having an amplitude greater than that of the horizontal synchronizing signal pulse so that by amplitude selection a signal free from horizontal pulses and including only the vertical synchronizing signal may be obtained. A signal containing only the horizontal synchronizing pulses and from which the vertical pulses have been removed may be obtained by the use of wave shape or frequency selective networks as will be pointed out more clearly below. It will be understood, of course, that wave shape or frequency selective means may be employed in both instances in lieu of the amplitude and wave shape selection of the preferred form.

The fundamental requirements of a synchronizing system for television use are as follows:

(1) Positive and precise synchronization must be effected.

(2) Synchronization must be such that both horizontal and vertical scanning means are in synchronization at all times.

(3) The horizontal and vertical synchronizing signals must be such that they may be combined and transmitted over the same channel without interfering one with the other or with the video signal, and further, these signals must be such that they will not introduce voltage transients in the separating or selecting apparatus which might deleteriously affect the performance of the system.

In the specific case outlined above, of a 345 line 30 frame per second, interlaced system, the horizontal synchronizing signal may comprise pulses of 4 to 7 microseconds duration occurring at a rate of 10,350 pulses per second. The vertical synchronizing signal may comprise pulses of 30 to 45 microseconds duration occurring 60 times per second. As may be seen in Fig. 29 these signals are established in an output circuit of an amplifier on one side of a reference axis. If simpler rather than interlaced scanning were used, the duration of the vertical synchronizing pulse might be doubled.

An important feature of the method is that the transmission of horizontal synchronizing pulses is continuous and the vertical synchronizing pulses so timed that they do not interfere with the former signal. Thus, the horizontal scanning means may at all times be in synchronization with the synchronizing signal and the departure from synchronization sometimes accasioned by the presence of the vertical signal of systems of the prior art avoided.

The overlapping of a horizontal and vertical pulse may be prevented by the use of the vertical impulse serrator unit #8 shown in Figs. 12, 12a, and 19. In the system of Fig. 12a, this unit serves to form the serrations or indentations in the broad vertical pulse disclosed in the said Campbell application. If desired, this unit may be used when the system includes the unit #7, as in Fig. 12, by which narrow impulses are formed. Under these conditions the serrating unit #8 functions not to provide indentations but to ensure that the sides of the vertical pulse will not overlap those of the horizontal pulses. Preferably the serrator is used with the narrow impulse method as an added precaution to overcome the effects of improper adjustment which may have been made elsewhere in the system, and to prevent time displacement of the vertical pulse over long time intervals.

Another important advantage of such narrow impulse system is that while the slope of the narrow pulse is sufficiently different from that of the horizontal synchronizing signals to permit discrimination by means of wave front selective circuits, still the slope of the vertical pulse is sufficiently steep to permit very accurate synchronization of the vertical scanning means. It will be noted that the slope of such a pulse will be approximately 25 times greater than that of the broad vertical pulse disclosed in the said Campbell application and, consequently synchronization may be made 25 times more accurately. For example, if the time error due to pulse-slope or amplitude variation, or both, of the Campbell system were as large as 50 microseconds, using the narrow pulse system this might be reduced to as low as 2 microseconds.

While the wave shape of the narrow pulse resembles that of the horizontal synchronizing signals more closely than does the broader vertical pulse of the prior art, there is still sufficient difference to permit easy separation by wave front or frequency selective networks. For the case of an interlaced picture such as that disclosed in Fig. 3, it is necessary that the duration of the narrow vertical pulse be less than one-half the duration of one line. Due to the interlacing, the narrow pulse will at one time follow immediately after a horizontal synchronizing pulse and the next consecutive time will appear immediately in front of a horizontal synchronizing pulse. For this reason there will be less symmetry between the synchronizing signals which return the scanning beam to the point A of Fig. 3, and the signals which would return it to point F than there would be between the corresponding signals in the case wherein the broad vertical pulse is used. On the other hand, when using the Campbell system, it is necessary to blank the video signal for a time duration of about 16 lines to permit the scanning beam to return from the bottom of the picture to the top. In the device of my invention, the narrow impulse may occur between say, the second and third horizontal pulses, occurring during this vertical blanking period, thus leaving a time interval corresponding to, say, 13 lines during which the picture is blanked, and the horizontal scanning means may recover from any transient introduced by the vertical pulse. In the corresponding case wherein a broad vertical pulse is used, this pulse may extend from, say the second or third to the sixth or seventh horizontal pulse of the blanked period, leaving a shorter time for the horizontal scanning means to recover from the transients introduced by this broad vertical pulse. Alternatively, for certain types of television reproduction, the blanking period may be reduced thus permitting the reproduction of a more detailed picture. In addition, the greater energy of the broad vertical pulse tends to introduce a larger transient than that of the narrow pulse, even though the latter may be of greater amplitude than the former. In general, it has been found that the circuit which discriminates between the horizontal and vertical signals, in the case wherein the narrow vertical pulse is used, may be so adjusted as to enable it to recover from any transient disturbance in less than the time of one horizontal line.

As may be readily apparent, if the vertical pulse is of greater than one line duration, it is necessary either to omit some of the horizontal pulses, or to provide serrations in the vertical pulse in which the horizontal pulses may be positioned. The former condition is undesirable due to the lack of synchronization occasioned by the presence of the vertical pulse. The latter method offers some disadvantages by virtue of the fact that some frequency components within the range of the horizontal synchronizing signal may be introduced by the serrations in the vertical pulse. In this respect the use of the narrow vertical pulse offers the advantage that little transient signal is introduced in the horizontal signal separator by the vertical pulse and yet the continuity of the horizontal synchronizing signal is not interrupted.

Separation of the horizontal synchronizing signal from the vertical may be obtained by wave shape or frequency selective means, as described in more detail below. One such circuit is shown in Fig. 38 the separation being accomplished by the resistance and capacitance combination 142 and 143. When the voltage across resistance 142 changes, a voltage will appear across the condenser 143 which will result in a charging or discharging current in resistance 142. The signal supplied to the following stage will be determined by the differential voltage across resistance 142 occasioned by this charging or discharging current. If the voltage output of stage 149 changes quickly as will be the case for horizontal pulses, a large charging current will be drawn through resistance 142 and the signal will be transferred without marked attenuation. If the voltage changes slowly, as in the case of the longer vertical pulses, the rate of charge will be much less, and the signal transferred more highly attenuated. As pointed out below, the time constant of this circuit may be of the order of one line or 97 microseconds. Under these conditions, any transient voltage introduced in this circuit by the vertical synchronizing signal would decay in a period equivalent to one line.

In Figs. 22 and 22a is shown a second method of obtaining the narrow vertical synchronizing pulses, in combination with the horizontal synchronizing signals and with the horizontal and vertical blanking signals, by means of a conventional light-chopper disk. This disk may have apertures VS, HS, HB, and VB corresponding to the narrow vertical synchronizing impulse, the horizontal synchronizing impulses, the horizontal blanking pulses, and the vertical blanking pulses, respectively, cut in an annular section of the disk. The disk may be driven at synchronous speed by a synchronous motor SM and light from sources LS may be permitted to pass through the proper apertures and then to call on photo electric cells PE so as to produced a signal in the output of each photo electric cell amplifier corresponding to the holes cut in the disk.

As the light chopper disk is well known in the art, it is deemed unnecessary to descrbei it further, except to point out that while it is relatively easy to obtain holes of the proper size, it is difficult to accurately space such holes in the disk. Consequently, the several methods of eliminating periodic frequency varations from a periodic signal, which have been described hereinabove, may advantageously be used with such a mechanical-electrical system. Further, certain other novel features of the invention may be used with such a system as has been described more particularly hereinabove.

In a specific preferred form, holes may be arranged on the disk to provide the vertical synchronizing, vertical blanking, intermediate frequency, and twice the horizontal synchronizing signals. The horizontal synchronizing and horizontal blanking may then be obtained by electrical means, such as described above, which will also smooth out periodic time variations in the signals.

In general, the signal forming apertures may be spaced at different radial distances, due precautions being observed to maintain the proper time-space relation and separate signals, thus obtained, or some of the signal apertures may be combined as shown in Fig. 22a and the electical separating circuits described elsewhere in the specification used to separate the several signals.

Speaking generally of the narrow pulse system, it will be noted that by means of this system I have provided a method by which accurate synchronization of the vertical synchronozing means at the transmitter and receiver may be obtained, and, in addition, the horizontal scanning means may be kept in accurate synchronization without requiring the two to miss a cycle or so during the duration of the vertical synchronizing signals. Furthermore, additional time is allowed the horizontal scanning means to recover from any transient which may have been introduced by the occurrence of the vertical synchronizing pulse, and the system is so arranged that the introduction of transients is minimized.

*Automatic control of background and brightness of the transmitted picture*

Since this feature of the invention relates generally to the system as a whole and must be described with reference to the successive functions of the component parts of the system, the following description will enable a clear understanding of the details of the entire system and the functioning thereof as well as a clear understanding of the automatic background control feature. As above stated, it is necessary, in order to obtain automatic control of background and brightness of the transmitted picture, that intelligence concerning the average value of the video signal be transmitted along with the video signal.

Figure 23:
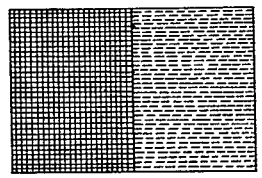
Figure 24:
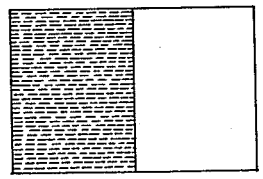
Figure 25:
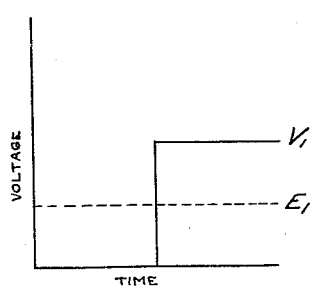
Figure 26:
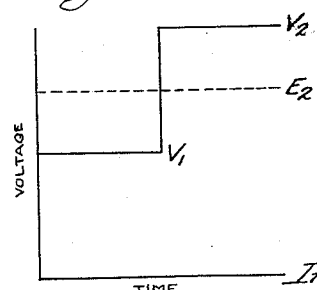

Referring now to Figs. 23 to 26, in which Fig. 23 represents an area one-half of which is black and one-half gray and Fig. 25 represents the video signal which might be obtained by scanning a horizontal line of the area of Fig. 23, it will be noted that the signal is zero for the portion corresponding to the blank portion and has some value $V_1$ corresponding to the gray portion. Likewise the video signal shown in Fig. 26, which would be obtained by scanning a horizontal line of the gray and white area of Fig. 24, would have a value $V_1$ representing the gray portion and a value $V_2$ corresponding to the white portion. The whole frame or picture would be obtained by scanning one line, then a line adjacent the first line, etc., according to some regular order. The video signal for the frame would consist of a number of cycles, one for each line, similar to those of Figs. 25 or 26. As far as A. C. components are concerned, the two signals are identical. The difference in illumination between the two is brought out by the zero-frequency component. It will be noted that in Fig. 25 this zero-frequency component would have a value equal to $E_1$ whereas in Fig. 26 it would have a value of $E_2$, these values corresponding to the average intensity of illumination of the whole area, and average voltage of the corresponding signal. For the case of moving objects, the average illumination will change at a rate depending upon the rate at which the differently illuminated objects appear and disappear from the picture. Consequently, the signal proportional to the average illumination, which has been defined to be the zero-frequency component, will have an amplitude which varies slowly as the average illumination of the picture changes. In other words, strictly speaking, the "brightness" signal or zero-frequency component is not an absolute zero-frequency signay but includes A. C. components of very low frequency compared with other frequencies of the video signal. The reference level for the said zero-frequency or brightness component may be taken arbitrarily to be the level corresponding to zero illumination.

It would be well at this point to distinguish between "brightness" and "contrast". As shown above, "brightness" may be considered as the measure of the average illumination of the picture or image. On the other hand, "contrast" may be defined as the difference in illumination between two points on the picture or image. It will be seen, therefore, that while the A. C. components of the video or picture signal may well represent and define contrast in a picture, they will not necessarily represent and control brightness accurately unless some method or means, such as the transmission of a signal to establish the reference level, is used. The present invention provides a method and means by which automatic brightness control may be maintained by establishing a fixed transmittable reference level or plurality of levels in the composite signal produced, and by so arranging and maintaining the video signal with respect to at least one of these levels that the zero-frequency or brightness control component is included therein.

Referring now to Fig. 27, the video signal generator may comprise a conventional camera tube 102 including a light-sensitive plate or screen 103 scanned by the electron beam. The beam may be deflected by conventional electromagnetic or electrostatic deflecting means (not shown) responsive to the horizontal and vertical synchronizing signals produced by the synchronizing signal generator. As the electron beam scans the plate or screen 103, a video signal substantially proportional to the intensity of light at a particular point being scanned is formed and this signal may be amplified in a resistance-capacitance coupled A. C. amplifier which may preferably be high frequency compensated to transmit the entire video frequency band. This amplifier may comprise a plurality of stages and, as illustrated, it comprises the vacuum tubes 104 and 105. By the use of non-conductive or A. C. coupled amplifiers, instability due to changes in the static current in the camera tube may be avoided. The amplified video signal is applied to the composite signal amplifier, shown in Fig. 28.

The background control signal, which comprises the above-mentioned zero-frequency components, is obtained from a conventional photocell 106 which may be focused on the object 107 being televised as indicated in Fig. 27. In order to obtain the proper signal it is preferable that the light falling on the cell come only from the object 107 and not include light from other objects whose image is not scanned on the mosaic. This may be accomplished by mounting a small lens 105a in fixed relation with the camera tube 102, and then masking the light from the lens 105a by the mask 103a so that the unmasked image which is formed there corresponds to the image being scanned on the mosaic of the camera tube. The light passed through the mask aperture may then be collected by a condenser lens 104a and focused on the photocell 106. As the position of the lenses is fixed with respect to the camera tube mosaic 103, a visual image formed by the lenses may be used to focus and direct the camera tube system.

The output of the photocell is proportional to the integrated illumination of the object or, in other words, to the average intensity of illumination of the object being televised. As this signal will include only low frequency components, it may be readily amplified by a conductively coupled amplifier 108 and applied to the composite signal amplifier of Fig. 28. It will be noted that the composite signal amplifier is energized by a negative video or picture signal, that is, one in which a more negative signal corresponds to brighter picture illumination. Consequently, a negative background control signal must be provided as indicated. The polarity of this signal may be adjusted by the number of stages of its preceding amplifier or by reversing the connections to the photo cell 106.

Referring now to Fig. 28, the composite signal amplifier comprises a tube 109 energized by the negative video or picture signal, a tube 110 energized by the negative background control signal, and a tube 111 energized by the positive blanking signal which will include both the horizontal and vertical blanking signals and which may be obtained from the synchronizing signal generator. The composite wave which is supplied by the composite signal amplifier is shown in Fig. 29, and two portions of the carrier wave modulated by this composite signal are shown in Fig. 30. Referring to these figures, the predetermined level $A_1A_2$, which is established in a manner presently to be described, corresponds to the no-light level. Since the envelopes of the two sides of the carrier wave are symmetrical, there are corresponding levels above and below the axis of the modulated wave. The level $A_1A_2$ may correspond to the no-light level of the video signal and the intensity of light at any point of the transmitted picture may be represented by the amplitude of the signal toward the axis of the modulated carrier wave, taking the level $A_1A_2$ as the reference axis. In other words, the portions 112 of the composite wave correspond to the video signal. One of these portions may correspond to the video signal obtained by scanning a line of Fig. 3. The synchronizing signals may be placed on the opposite side of the level $A_1A_2$, the horizontal synchronizing pulses being shown at 113 and the vertical synchronizing pulses at 114. The interval 115, during which the video signal is blanked, is obtained by means of the horizontal blanking signal and corresponds to the interval required for the scanning beam to be returned from the point B of Fig. 3 to the point D, this motion being caused by the horizontal scanning means which may be actuated by the horizontal synchronizing pulse 113 occurring during the said blanked interval. The interval 116, during which the video signal is likewise blanked, corresponds to the interval required to return the beam from the point G to the point A of Fig. 3, the scanning means producing this motion being controlled by the narrow vertical synchronizing pulse 114. The blanked interval 116 might extend for, say sixteen horizontal lines.

The second portion of the modulated carrier wave, shown at the right of Fig. 30, differs from the first only in that the vertical pulse 114 occurs at the end of a horizontal line, whereas, in the previous case, this pulse occurred at the beginning of a horizontal line. These illustrations are representative of the conditions where in one case the beam was returned from the point G to the point A of Fig. 3, whereas in the other case, it was returned from the point E to the point F. It will be noted that by establishing a predetermined level $A_1A_2$ and by placing impulses of predetermined amplitude above this level, amplitude discrimination between pulses 113 and 114 at the receiver may be more readily obtained, since the level $A_1A_2$, or any other similar level, may be readily established at the receiver by means of a battery.

Consider now the operation of the composite signal amplifier shown in Fig. 28. The background control signal amplifier which transmits the zero-frequency video signal components is conductively coupled to tube 110. The video contrast signal and the blanking signal include only A. C. components and therefore these signals may be supplied to tubes 109 and 111 respectively through conventional coupling means. The outputs of the three tubes 109, 110, and 111 are added in the common output circuit including the resistance 117, and the composite signals is used to energize tube 118 by means of the conductive coupling thereto. By virtue of the common load circuit, the negative background control signal and the negative picture contrast signal are added together producing a signal including the zero-frequency components necessary for automatic background control. The blanking signal may be such as to maintain the space current of tube 111 at some small value except for the interval during which the scanning beam is returned to a new starting point. During that interval, the blanking signal becomes sufficiently positive to increase the current drain of tube 111, through resistance 117 enough to bias tube 118 beyond plate current cut-off. During the presence of the video signal, tube 119, which is adapted to be energized by the synchronizing signals, including both horizontal and vertical signals and whose load circuit is common with that of tube 118, is drawing some constant current which establishes a predetermined constant voltage drop in the resistance 120. In the absence of a blanking signal, the video signal with the back-ground component is transferred through tube 118 and will appear across the resistance 120 on one side of the reference level $A_1A_2$ which is established by the current drain of tube 119. During the blanking interval, tube 118 is biased beyond cut-off, and consequently draws no current, and in addition, the synchronizing signal is negative and, therefore, reduces the current drain of tube 119, reducing the voltage across resistance 120, thus establishing the synchronizing signals in the composite signal during the blanking interval with opposite polarity from the video signal with respect to the reference level $A_1A_2$. The common load circuit of tubes 118 and 119 may be in the anode circuit, or where this output is supplied to a low impedance transmission line, it may be in the cathode circuit as shown. The polarities of the video and synchronizing signals with reference to the level $A_1A_2$ will, of course, depend upon the position of the load circuit.

The transmission line may comprise a coaxial cable whose surge impedance may be of some small value, say, 34 ohms. To avoid reflection, the cable must be terminated at each end by an impedance substantially the same as the above-mentioned surge impedance. Thus, the impedance looking into the terminated line from tubes 118 and 119 will be of the order of 17 ohms. This impedance is sufficiently low so as not to cause any degenerative effects in the composite signal amplifier. It will be understood, of course, that although only one tube has been shown for each particular function in this amplifier a plurality of tubes may be and preferably are employed for each function. Furthermore, the tubes 118 and 119 have their plate to cathode impedance in shunt with the external terminating impedance and this must be considered in choosing the proper terminating impedance.

As mentioned above in connection with the general description of the entire system shown in Fig. 1, the composite signal shown in Fig. 29 is transmitted via the coaxial transmission line from the studio to the transmitting station. Inasmuch as the apparatus at the transmitting station involves the use of the D. C. compensated emplifier mentioned above thus device will now be described before proceeding with the description of the remaining apparatus at the transmitting station.

In Fig. 31 is shown one form of an amplifier which will transmit both high frequency and unidirectional components. The signal supplied by a signal source $E_s$, which may comprise a vacuum tube, is supplied to the grid of the amplifier tube $V_3$ by means of a transfer impedance comprising a condenser $C_2$ shunted by a series circuit including two impedances $Z_1$ and $Z_2$ and a battery $B_1$. The battery will have a certain capacitance to ground which is indicated by $C_g$. At high frequencies the impedance of $C_2$ will be small as compared with $Z_1$ and $Z_2$ and consequently the signal will be transferred to the grid through this impedance. The capacity to ground $C_g$ of the battery $B_1$ will not cause high frequency cut-off due to the fact that this capacity is isolated from the grid by the two impedances $Z_1$ and $Z_2$. These latter impedances may comprise either resistances or inductances and should be such that their impedance does not decrease with increasing frequency. Since the impedance of the condenser $C_2$ to a unidirectional component is infinite, that component will be transferred through the impedances $Z_1$ and $Z_2$ and the battery, and the battery voltage may be such as to bias the grid of the tube $V_3$ properly with respect to the source $E_s$. The output of the device $V_3$ may be taken across a resistance in the anode circuit in the usual way. In Fig. 31, it is shown as taken between the plate of the tube and a source of voltage connected to ground. This source serves to balance out the constant unidirectional component introduced by the tube.

It will be seen that with such a device, uniform gain may be obtained in the high frequency range where the signal is transferred through $C_2$, and also in the low frequency range including unidirectional components where the signal is transferred through the second branch including $Z_1$ and $Z_2$ and $B_1$, and that in the intermediate frequency, where an appreciable portion of the signal is being transferred through both branches, the gain may vary by an amount depending upon the design of the circuit. It will be noted that such a circuit permits the use of a blocking battery $B_1$ by isolating the capacititative impedance to ground introduced by such a battery.

While the above described stage is satisfactory for certain applications, an exactly compensated equivalent D. C. coupled amplifier, which has a uniform gain vs. frequency characteristic over the entire video frequency range including zero frequency components and in which there is no phase distortion as between the input and output signals, may be made by dividing the amplifier stage into two branches: a conventional A. C. amplifier having the usual low frequency cut-off, and an additional D. C. coupled amplifier having a gain vs. frequency response complementary to the corresponding characteristic of the A. C. amplifier. By combining the outputs of the two amplifiers, substantially uniform gain over the entire frequency range is obtained.

Such an amplifier is shown in Fig. 32. This amplifier comprises two similar stages as indicated by the dotted line. The signal is applied to the network consisting of resistances $R_2$ and $R_3$ and condensers $C_2$ and $C_3$. The A. C. coupled branch comprises tube $V_3$, coupling condenser $C_2$ and grid leak $R_2$. The conductively coupled stage comprises resistance $R_3$, condenser $C_3$ and battery $B_1$ and the tube $V_4$. The outputs of the two stages are combined in the common anode resistance $R_4$.

The operation of this device is substantially as follows: The entire signal will appear across diagonal points of the network which points connect the network to the signal source and to ground through the battery $B_2$. The portion of the total signal appearing across the resistance $R_2$ is supplied to tube $V_3$, while the portion of the signal appearing across the capacitance $C_3$, is applied to the tube $V_4$. In both cases the amount of the total signal transferred will depend upon the ratio of the impedance across which the signal appears to the total impedance of the branch containing that impedance. Considering the branch supplying signals to tube $V_3$, it will be noted that the impedance of the condenser $C_2$ will become infinite at zero frequency, consequently no unidirectional components will be transferred to this tube, but with increasing frequency, the impedance of $C_2$ will decrease and consequently at high frequency the total signal will be transferred by this tube. The signal transferred to tube $V_4$ on the other hand, is taken from across the condenser $C_3$, consequently, at zero frequency the entire signal will appear across $C_3$ but with higher frequency the amount of signal will decrease. In a preferred form of the invention the ratio of the impedance $R_2$ to the impedance of $C_2$, may be made equal to the ratio of the impedance of $R_3$ to the impedance of $C_3$ for such desired frequencies. This may be done by making the product $R_2C_2$ equal to the product $R_3C_3$. Under these circumstances the voltage to ground at the point connecting $R_3$ and $C_3$ together will be complementary to the voltage at the point connecting $R_2$ and $C_2$. Thus of the total voltage appearing across the diagonal, the part appearing across the one impedance will be transferred by one tube, the part appearing across the other impedance will be transferred by the other tube, and as these two parts when added together give the total input signal, obviously each may be amplified by the same amount and then added to give an amplified total signal.

It will be noted that the blocking battery $B_1$ may be used without the deleterious effects encountered in the use of such a battery in a conventional D. C. amplifier since the capacitance of the battery $B_1$ to ground is in shunt with that of the condenser $C_3$ and simply adds to it. It has been found that such an amplifier has a gain which may be made independent of frequency over the video frequency range, that the output of the device will be similar in wave shape to the input even for transitory conditions and that there will be no phase distortion introduced.

A second stage similar to the one described may be coupled to the first stage as shown in Fig. 32. The corresponding elements of the two stages have been designated accordingly. If the load resistance $R_4$ is small as compared with $R_2$ and $R_3$ as is necessary for a wide band video amplifier the device may be used as shown; if, however, a large value of $R_4$ is used to increase the gain of the stage a condenser $C_4$ (not shown) should be inserted between the common anode connection to $R_4$ and the common connection of $R_2$ and $C_2$. For exact compensation the series impedance of $R_4$, shunted by the tube plate impedance, and $C_4$ should be proportional to the series impedance of $R_2$ and $C_2$ which in turn is proportional to that of $R_3$ and $C_3$ for all desired frequencies.

In Fig. 33, there is illustrated another form of the device which comprises four stages in the A. C. amplifier circuit and only two stages in the D. C. amplifier circuit. These stages are substantially identical with the corresponding ones of the two preceding figures and the parts are correspondingly designated. The use of a lesser number of stages in the D. C. amplifier branch than in the A. C. amplifier branch is made possible by the fact that the gain per stage obtainable in the conventional video signal amplifier is relatively low due to the fact that low impedances must be used to minimize the effect of the capacity to ground of the customary blocking condensers, whereas this restriction does not apply to the D. C. compensator branch. Consequently, while it may be necessary to use, say, four stages of A. C. amplification, as illustrated in Fig. 33, the same gain may be obtained in the D. C. compensator branch by the use of two stages as shown.

In Fig. 34, the gain vs. frequency characteristics are shown for the single and multi-stage amplifiers of Figs. 32 and 33. The solid line curves 121 and 122 are those of a single and multi-stage amplifier as in Fig. 32, the curve 121 being the curve of the A. C. amplified stage, while the curve 122 is that of the D. C. compensator stage. It will be seen that the curve 122 shows rapidly decreasing gain until a cut-off point is reached at a relatively low frequency. This depicts in an exaggerated fashion the disadvantage of the D. C. amplifier as above mentioned, and is due largely to the filter $R_3C_3$, it having been pointed out above that the cut-off at relatively low frequency prevents amplification throughout any useful video signal range. In this case the cut-off is due to the condenser $C_3$, however, in a conventional conductively coupled D. C. amplifier, the capacity to ground of the blocking battery would bring about the same result but at a higher frequency. It will also be seen that the curve 121 and the curve 122 are complementary so that a resultant curve 123 is obtained, which curve indicates that substantially uniform over-all gain is obtained throughout the video signal range. Due to the various stray capacities in the amplifier it will have the high-frequency cut-off common to all amplifiers which may, however, be made well above the video range by proper design.

When the device of Fig. 33 is employed, the A. C. amplifier branch exhibits a curve such as shown in broken-line representation at 124. It will be noted that this curve shows a reduction in gain over the range of lower frequencies as compared to the curve 121. The resultant curve 125 of curves 122 and 124, exhibits a slight reduction in gain at the lower frequencies. Inasmuch as this reduction in gain occurs at frequencies in the video signal range which are seldom encountered, the reduction is of little importance. In fact, this reduction may, in some instances, be desirable since it may be desired to diminish certain undesired signals at the frequencies in question. This depression in gain at low frequency may be controlled by varying the ratio of $R_4'C_4$ to $R_2C_2$ in which $R_4'$ is the shunt resistance of $R_4R_5$ and the anode to cathode impedance of the preceding tube. If this ratio is materially greater than one, the depression will be of negligible magnitude and the gain of the over-all amplifier will be substantially independent of frequency within the entire video range.

Referring now to Fig. 35 and bearing in mind the general arrangement disclosed in Fig. 1, the output of the transmission line leading from the studio may be applied at the transmitting station to a D. C. compensated line amplifier 126 through a coupling tube 126a. The coupling may be effected by means of a blocking battery 127 and associated elements as shown in Fig. 35, or it may be obtained by means of the cathode drive circuit shown in Fig. 36 and which includes the use of the cathode load resistor 128 in the output circuit of tube 126a. The choice of these methods will depend upon the desired signal polarity. In any event, the D. C. compensated amplifier may take any of the forms above described.

It will be noted that although a wide band of frequencies is being transmitted through the system, the conductive coupling of Fig. 35 may be used by virtue of the fact that the capacitative impedance of the blocking battery to ground even at the highest frequencies is large compared to the low impedance of the transmission line and, consequently, there will be no attenuation of the high frequencies by virtue of this by-pass impedance. Likewise no degeneration was observed in the cathode input circuit of Fig. 36 which again is due to the low value of the terminating impedance. Further the voltage drop in this impedance due to the static space current of the tube 126a is of negligible importance. The remaining parts of the system are similar to those shown in Fig. 33. The output of the D. C. compensated line amplifier may be applied by mean of conductive coupling to the modulated stage shown in Fig. 37, the point 135 of Fig. 35 being connected to 136 of Fig. 37. The monitor system may be energized by means of a coupling tube similar to tube 126a employed to couple the D. C. compensated amplifier to the said line, as shown in Figs. 35 and 36.

Referring to Fig. 37, the modulated stage may comprise two tubes 129 and 130 connected in push-pull relation, as illustrated, and energizeable by any conventional oscillator such as that shown at 131. It may be preferable to employ a crystal controlled oscillator which serves to determine the carrier frequency. It will be noted that the plate voltage applied to the tubes 129 and 130 will have the wave form of the composite signal to be transmitted and, consequently, if the amplitude of oscillations produced in the output of the modulated stage is proportional to the plate voltage, the envelope of the modulated carrier signal will conform identically to the composite signal. This condition may be readily obtained by proper selection of tubes and circuit constants.

The portion of the receiving system subsequent to and including the linear detector, as illustrated schematically in Fig. 2, is shown in detail in Fig. 38. Referring to that figure, the detector is shown at 132. It will be seen that the voltage set up across the resistor 133 in the detector circuit will conform in shape with the composite signal shown in Fig. 29, the polarity being such that synchronizing peaks are negative. The signal thus obtained may then be amplified by a conductively coupled or a D. C. compensated amplifier such as that disclosed and supplied to a picture tube. The polarity of the signal applied to the picture tube may be determined by the number of stages of the video amplifier or by the design of the detector. The receiver scanning means may be synchronized by selecting the individual synchronizing signals from the composite signal. This may be done by first selecting the combined synchronizing signals, from the video signal by amplitude selection. In Fig. 38, the amplified composite signal is taken from the output of the first video amplifier stage designated generally as 134 and applied to the amplitude limited tube 147 by means of conductive coupling. Tube 147 is so biased by blocking battery 148 that its grid voltage is more positive than that corresponding to plate current cut-off only for that portion of composite signal whose voltage is above the level $A_1A_2$. It will be noted that by taking the voltage from the output of the first video frequency amplifier 134 a signal is obtained in which the synchronizing portion corresponds to the more positive portion of the composite signal. If the detector were inverted, this signal could be obtained directly from the detector output but an additional video frequency stage would be necessary to correct the polarity relation of the picture tube. In order that the level $A_1A_2$ be establishable at the input of the selector tube 147, it is desirable that conductive coupling or its equivalent be used from the linear detector up to the selector tube input. This amplification of zero frequency components up to the point where the composite signal is supplied to the selector tube is desirable due to the fact that in general the video signal is non-periodic and consequently, the maintenance of the level $A_1A_2$ in the composite signal can be obtained only by use of conductive coupling or its equivalent. The output signal from the separator tube is, however, periodic since it contains only the combined synchronizing signals and consequently, A. C. coupling may be used for the remaining part of the synchronizing system.

The output of the selector tube 147 may be further amplified by tube 149 and then supplied to two separator stages 140 and 141, one of which selects the vertical synchronizing signal and the other the horizontal. The vertical synchronizing signal separator stage may comprise an amplitude limiting tube 141 whose grid is biased beyond plate current cut-off by a biasing battery. The combined synchronizing signals with a polarity such that the peaks of the vertical synchronizing signal are more positive than those of the horizontal, are applied to the input of the tube 141 and the bias may be so adjusted that only the peaks of the vertical pulses are transferred through the stage. In other words, the tube 141 by amplitude selection discriminates between the narrow vertical synchronizing pulse 114 and the horizontal synchronizing pulse 113 of Fig. 29 and transmits only a signal corresponding to the vertical synchronizing signal. This signal may be further amplified and supplied to a blocking tube oscillator 137, such as described above. The output of the blocking tube oscillator may be supplied to the vertical scanning voltage generator 138 which serves to apply the vertical scanning voltage to the vertical deflecting coils 139 of the picture tube as will be well understood.

The output of the selector stage 147 as amplified by stage 149 may also be supplied to the horizontal synchronizing signal separator stage 140 which may comprise a vacuum tube 140 whose input is coupled to the output of tube 149 by means of a resistance-capacitance coupling 142, 143. By adjusting the time constant of the circuit including the elements 142 and 143 so that it will be of less value than the duration of one horizontal scanning line, the circuit may be made to discriminate between the horizontal and vertical synchronizing signals. The horizontal synchronizing signals, being of high frequency, will be transferred without marked attenuation but the narrow vertical synchronizing pulses having a less steep slope and comprising lower frequency components will not be transferred so readily. If the impedance of the element 143 at frequencies corresponding to the frequency components of the narrow vertical synchronizing pulses is comparable to or greater than the impedance of the element 142, the vertical synchronizing pulses will be sufficiently attenuated by this network as to be of less amplitude than those of the horizontal synchronizing pulses. Consequently, by proper circuit design, the vertical synchronizing signal component may be largely eliminated from the signal, leaving only the substantially unalternated horizontal synchronizing signal. This signal may be supplied to a blocking tube oscillator 144 and may then be applied to the horizontal scanning voltage generator 145 which serves to supply the horizontal scanning voltage to the horizontal deflecting coils 146 of the picture tube as well understood.

It will be seen that by means of the D. C. compensated amplifier employed in the system, the reference level $A_1A_2$ is transmitted in the composite signal; established by the detector at the receiver; and the video signal supplied by the detector tube includes the zero-frequency component which provides background and brightness control corresponding to that of the object being televised at the studio. To obtain this condition, it is simply necessary to establish the proper constant reference level at the receiver which may be done by means of a proper biasing battery as above described.

It will be seen from the foregoing description and accompanying illustrations that novel means are provided for the accomplishment of the objects above mentioned. While the invention has been illustrated in specific form for the purpose of disclosure, it will be apparent that modifications may be resorted to without departing from the spirit and scope of the invention. Throughout the drawings, the various tubes have been illustrated as simple three-element tubes or triodes or in certain cases as pentodes or five-element tubes for the sake of simplicity, but it will be understood that any suitable types of tubes may be employed and that multi-function tubes may be used. It will be noted also that some of the tubes have been shown with grid biasing sources while others have been shown without such sources, the reason for this being that certain specific commercial forms of the latter tubes do not require any grid bias. It will be understood, therefore, that in any instance, a grid bias may or may not be employed depending upon the particular tube used.

The terms "conductive", "conductively coupled", etc., used hereinbefore and in the claims are intended to indicate means which will transmit direct current and zero frequency components and "non-conductive", "non-conductively coupled", etc., to indicate means which will not transmit direct current and zero frequency components but will transmit A. C. signal components thus following the nomenclature used in the art.

I claim:

1. In an electrical system; a source of input signals comprising a train of signal cycles, some of said cycles having individual periods which deviate from the mean period of said input signals; a circuit having a potential thereacross; intermittently operative means, whose operative period is initiated by an input signal, for decreasing the amplitude of said potential during a predetermined time interval by an amount dependent at least in part upon the duration of said time interval; means for increasing the amplitude of said potential whenever said first means is inoperative; said potential increase and said potential decrease causing said potential to oscillate about a level to form a sawtooth signal; and amplitude-responsive means responsive to said potential for forming an output signal whenever said potential exceeds the threshold level of said amplitude-responsive means, said output signal having a period more nearly equal to said mean period of said input signal than the period of said initiating input signal cycle.

2. In an electrical system; a source of input signals comprising a train of signal cycles, some of said cycles having individual periods which deviate from the mean period of said input signals; a circuit having a potential thereacross; intermittently operative means, whose operative period is initiated by an input signal, for decreasing the amplitude of said potential during a predetermined time interval by an amount dependent at least in part upon said signal amplitude; means for increasing the amplitude of said potential whenever said first means is inoperative at a rate dependent at least in part upon said signal amplitude; said potential increase and said potential decrease causing said potential to oscillate about a level to form a sawtooth signal; and amplitude-responsive means responsive to said potential for forming an output signal whenever said potential exceeds the threshold level of said amplitude-responsive means, said output signal having a period of more nearly equal to said mean period of said input signal than the period of said initiating input signal cycle.

3. In an electrical system for forming timed signals, a signal source having a frequency subject to small frequency variations, means for producing a signal of harmonic frequency, means for reducing frequency variations of said harmonic frequency, and means energized by signals derived from said signal source and said second means for producing pulse signals occurring in accordance with the lower frequency rate but completely timed by said modified higher frequency.

4. In an electrical system for forming timed signals, a signal source having a frequency subject to small frequency variations, means for producing a signal of harmonic frequency, means for reducing frequency variations of said harmonic frequency, means energized by signals derived from said signal source and said second means for producing pulse signals occurring in accordance with the lower frequency rate but completely timed by said modified higher frequency, means responsive to said modified harmonic signal to form higher harmonic signals, and means for reducing frequency variations in said higher harmonic signals and for forming modified higher harmonic frequency timing signals.

5. In a wave shaping circuit, a plurality of space discharge devices having anodes, control elements and cathodes, said cathodes being connected in common, said control elements being adapted to control signals having an amplitude within a predetermined range, a resistance connected to said control element of one of said space discharge devices, a second resistance connected to said control element of a second space discharge device, biasing means for said space discharge devices comprising impedance means having a potential thereacross connected to said common cathode connection, a source of signals serially connected to said biasing means and said first resistance and adapted to supply input signals having an amplitude such that at least a portion of said input signals extend outside said predetermined range, a load impedance and a source of electrical energy serially connected to the anode of said first discharge device and to said cathodes through said biasing means, nonconductive signal transfer means connected to said anode of said first discharge device and said second resistance, a conductive impedance serially connected to said second resistance and said biasing means, and an output circuit connected to said anode of said second space discharge device.

6. In an electrical system for forming pulse signals, a source of a wave signal, means for deriving a wave signal from said source, signal-amplitude-responsive means energized by said derived signal for forming a signal having a flattened-wave-shape, phase-shifting means for deriving from said source a second wave signal similar in frequency and wave-shape to said first derived signal but displaced in time relation with respect thereto, a second signal-amplitude-responsive means energized by said second derived signal for forming a second flattened-wave signal, and means for combining said flattened-wave signals to form a resultant pulse signal.

7. In an electrical system for forming pulse signals, a source of a wave signal, means for deriving a wave signal from said source, signal-amplitude-responsive means energized by said derived signal for forming a signal having a flattened-wave shape, phase-shifting means for deriving from said source a second wave signal similar in frequency and wave shape to said first derived signal but displaced in time relation with respect thereto, a second signal-amplitude-responsive means energized by said second derived signal for forming a second flattened-wave signal, means for combining said flattened-wave signals to form a resultant pulse signal, and a third signal-amplitude-responsive means for transmitting only part of said resultant pulse signal.

8. In an electrical system for forming pulse signals, a source of a wave signal, means for deriving a wave signal from said source, signal-amplitude-responsive means energized by said derived signal for forming a signal having a flattened-wave shape, phase-shifting means for deriving from said source a second wave signal similar in frequency and wave shape to said first derived signal but displaced in time relation with respect thereto, a second signal-amplitude-responsive means energized by said second derived signal for forming a second flattened-wave signal, said first and second signal-amplitude-responsive means comprising signal-amplitude-limiting transfer devices for limiting the amplitude of the signal transferred by each device to a small portion of the amplitude of the signal supplied thereto, means for combining said flattened-wave signals to form a resultant pulse signal, and a third signal-amplitude-responsive means for transmitting only part of said resultant pulse signal.

9. In an electrical system for forming pulse signals, a source of a wave signal, means for deriving a wave signal from said source, signal-amplitude-responsive means energized by said derived signal for forming a signal having a flattened-wave shape, phase-shifting means for deriving from said source a second wave signal similar in frequency and wave shape to said first derived signal but displaced in time relation with respect thereto, a second signal-amplitude-responsive means energized by said second derived signal for forming a second flattened-wave signal, said first and second signal-amplitude-responsive means comprising signal-amplitude-limiting transfer devices for limiting the amplitude of the signal transferred by each device to a small portion of the signal supplied thereto, between two amplitude levels symmetrical with respect to the signal supplied, means for combining said flattened-wave signals to form a resultant pulse signal, and a third signal-amplitude-responsive means for transmitting only part of said resultant pulse signal.

10. In an electrical system for forming pulse signals, a source of a wave signal, means for deriving a wave signal from said source, signal-amplitude-responsive means energized by said derived signal for forming a signal having a flattened-wave shape, means for deriving from said source a second wave signal similar in frequency and wave shape to said first derived signal but opposite in phase relation with respect thereto, phase-shifting means for further displacing said second derived signal in time relation with respect to said first derived signal, a second signal-amplitude-responsive means energized by said displaced second signal for forming a second flattened-wave signal, means for combining said flattened-wave signals to form a resultant pulse signal, and a third signal-amplitude-responsive means for transmitting only part of said resultant pulse signal.

11. In an electrical system for forming pulse signals, a source of a wave signal, means for deriving a wave signal from said source, signal-amplitude-responsive means energized by said derived signal for forming a signal having a flattened-wave shape, phase-shifting means for deriving from said source a second wave signal similar in frequency and wave shape to said first derived signal but displaced in time relation with respect thereto, a second signal-amplitude-responsive means energized by said second derived signal for forming a second flattened-wave signal, means for combining said flattened-wave signals to form a resultant pulse signal, a third signal-amplitude-responsive means for transmitting only part of said resultant pulse signal, means for deriving a third wave signal from said source, and phase-shifting means for adjusting the time of occurrence of said resultant pulse signal with respect to said third signal.

12. In an electrical system for forming pulse signals, a source of a wave signal, means for deriving a wave signal from said source, signal-amplitude-responsive means energized by said derived signal for forming a signal having a flattened-wave-shape and comprising positive and negative pulses of unequal duration, means for deriving from said source a second wave signal similar in frequency and wave-shape to said first derived signal but opposite in phase relation with respect thereto, a second signal-amplitude-responsive means energized by said second derived signal for forming a second flattened-wave signal comprising positive and negative pulses such that the shorter pulse of said first flattened-wave signal occurs within the duration of one pulse of said second flattened-wave signal, and means for combining said flattened-wave-signals to form a resultant pulse signal having two pulses during each cycle of said first-mentioned wave signal.

13. In an electrical system for forming pulse signals, a source of a wave signal, means for deriving a wave signal from said source, signal-amplitude-responsive means energized by said derived signal for forming a signal having a flattened-wave-shape and comprising positive and negative pulses of unequal duration, means for deriving from said source a second wave signal similar in frequency and wave-shape to said first derived signal but opposite in phase relation with respect thereto, a second signal-amplitude-responsive means energized by said second derived signal for forming a second flattened-wave signal comprising positive and negative pulses of unequal duration such that the shorter pulse of said first flattened-wave signal occurs within the duration of the longer pulse of said second flattened-wave signal, the longer and shorter pulses of said second flattened-wave signal having the same duration, respectively, as those of said first flattened-wave signal, and means for combining said flattened-wave-signals to form a resultant pulse signal having two pulses during each cycle of said first-mentioned wave signal.

14. In an electrical system for forming pulse signals, a source of a wave signal, means for deriving a wave signal from said source, signal-amplitude-responsive means energized by said derived signal for forming a signal having a flattened-wave-shape and comprising positive and negative pulses of unequal duration, means for deriving from said source a second wave signal similar in frequency and wave-shape to said first derived signal but opposite in phase relation with respect thereto, a second signal-amplitude-responsive means energized by said second derived signal for forming a second flattened-wave signal comprising positive and negative pulses such that the shorter pulse of said first flattened-wave signal occurs within the duration of one pulse of said second flattened-wave signal, said first and second signal-amplitude-responsive means comprising signal-amplitude-limiting transfer devices for limiting the amplitude of the signal transferred by each device to a small portion of the amplitude of the signal supplied thereto, and means for combining said flattened-wave signals to form a resultant pulse signal having two pulses during each cycle of said first-mentioned wave signal.

15. In an electrical system for forming pulse signals, a source of a wave signal, means for deriving a wave signal from said source, signal-amplitude-responsive means energized by said derived signal for forming a signal having a flattened-wave-shape and comprising positive and negative pulses of unequal duration, means for deriving from said source a second wave signal similar in frequency and wave-shape to said first derived signal but opposite in phase relation with respect thereto, a second signal-amplitude-responsive means energized by said second derived signal for forming a second flattened-wave signal comprising positive and negative pulses such that the shorter pulse of said first flattened-wave signal occurs within the duration of one pulse of said second flattened-wave signal, said first and second signal-amplitude-responsive means comprising signal-amplitude-limiting transfer devices for limiting the amplitude of the signal transferred by each device to a small portion of the amplitude of the signal supplied thereto between two amplitude levels asymmetrical with respect to the signal supplied, and means for combining said flattened-wave signals to form a resultant pulse signal having two pulses during each cycle of said first-mentioned wave signal.

16. In an electrical system for forming pulse signals, a source of a wave signal, means for deriving a wave signal from said source, signal-amplitude-responsive means energized by said derived signal for forming a signal having a flattened-wave-shape and comprising positive and negative pulses of unequal duration, means for deriving from said source a second wave signal similar in frequency and wave-shape to said first derived signal but opposite in phase relation with respect thereto, a second signal-amplitude-responsive means energized by said second derived signal for forming a second flattened-wave signal comprising positive and negative pulses such that the shorter pulse of said first flattened-wave signal occurs within the duration of one pulse of said second flattened-wave signal, said first and second signal-amplitude-responsive means comprising asymmetrical amplitude-limiting transfer devices adjusted to have the same amplitude limits, and means for combining said flattened-wave signals to form a resultant pulse signal having two pulses during each cycle of said first-mentioned wave signal.

17. In an electrical system for forming a timed pulse signal whose occurrence is dependent upon the presence of one pulse signal and whose pulse terminations are timed by a timing pulse signal, the combination of a signal-amplitude-responsive device having an input circuit and an output circuit, constructed and arranged to form in response to an input signal, an output signal corresponding to and determined solely by that portion of the input signal above a certain amplitude level, means for forming a pulse signal whose pulses rise abruptly to an amplitude less than said amplitude level, means for forming a timing pulse signal harmonically related in frequency to said first pulse signal, means for combining said first pulse signal and said timing pulse signal in the input circuit of said amplitude-responsive device, the amplitude of said timing pulse signal being less than said amplitude level and the sum of the amplitudes of both of said signals being greater than said amplitude level, and means for deriving the said timed pulse signal from said output circuit.

18. In an electrical system for forming timed pulse signals, means for forming a pulse signal of rectangular wave-shape, means for forming a second signal whose frequency is a harmonic of the frequency of said pulse signal, means for combining said signals to produce a resultant signal, and signal-amplitude-responsive means energized by said resultant signal for producing an output pulse signal corresponding to said second signal during the simultaneous occurrence of said first pulse signal and said second signal, and for preventing the formation of an output signal during the occurrence of either signal alone.

19. In an electrical system for forming timed pulse signals, means for forming a pulse signal of rectangular wave-shape, means for forming a second signal whose frequency is a harmonic of the frequency of said pulse signal, said first-mentioned means being constructed and arranged to form a pulse signal whose duration is less than twice the period of said second signal, means for combining said signals to produce a resultant signal, and signal-amplitude-responsive means energized by said resultant signal for producing an output pulse signal corresponding to said second signal during the simultaneous occurrence of said first pulse signal and said second signal, and for preventing the formation of an output signal during the occurrence of either signal alone.

20. In an electrical system for forming timed pulse signals, means for forming a pulse signal of rectangular wave-shape, means for forming a second pulse signal whose frequency is a harmonic of the frequency of said first pulse signal and at least some of whose pulses have at least one steep wave termination, means for combining said signals to produce a resultant signal, and signal-amplitude-responsive means energized by said resultant signal for producing an output pulse signal corresponding to said second signal during the simultaneous occurrence of said first pulse signal and said second signal, and for preventing the formation of an output signal during the occurrence of either signal alone.

21. In an electrical system for forming timed pulse signals, means for forming a pulse signal of rectangular wave-shape, means for forming a second signal whose frequency is a harmonic of the frequency of said pulse signal, means for combining said signals to produce a resultant signal, and signal-amplitude-responsive means energized by said resultant signal for producing an output pulse signal corresponding to said second signal during the simultaneous occurrence of said first pulse signal and said second signal, and for preventing the formation of an output signal during the occurrence of either signal alone, said signal amplitude-responsive means comprising an amplitude-limiting device for transmitting only that portion of said resultant signal having an amplitude greater than the amplitude of either of the constituent signals.

22. In an electrical system for forming timed pulse signals, means for forming a pulse signal of rectangular wave-shape, means for forming a second signal whose frequency is a harmonic of the frequency of said pulse signal, means for deriving from said second signal a signal having a flattened wave-shape, means for combining said pulse signal and said flattened-wave signal to produce a resultant signal, and signal-amplitude-responsive means energized by said resultant signal for producing an output pulse signal corresponding to said second signal during the simultaneous occurrence of said first pulse signal and said second signal, and for preventing the formation of an output signal during the occurrence of either signal alone.

23. In an electrical system for forming timed pulse signals, means for forming a pulse signal of rectangular wave-shape, means for forming a second signal whose frequency is a harmonic of the frequency of said pulse signal, means for combining said signals to produce a resultant signal, and means for so adjusting the time of occurrence of said first pulse signal and said second signal that the output pulse signal produced by said amplitude-responsive means includes only one pulse for each pulse of said first pulse signal.

24. In an electrical system for forming a timed pulse signal whose occurrence is dependent upon the presence of one pulse signal and whose pulse terminations are timed by a timing pulse signal, the combination of a signal-amplitude-responsive device having an input circuit and an output circuit constructed and arranged to form in response to an input signal, an output signal corresponding to and determined solely by that portion of the input signal between a lower and an upper amplitude level, means for forming a pulse signal having a step-like pulse termination in which the lower part of the pulse rises abruptly to an amplitude less than said lower amplitude level and the upper part of the pulse rises abruptly to a second amplitude greater than said upper amplitude level, means forming a timing pulse signal harmonically related in frequency to said first pulse signal, means for combining said first pulse signal and said timing pulse signal in the input circuit of said amplitude-responsive device, the amplitude of said timing pulse signal being less than said lower amplitude level, and the sum of the amplitudes of said timing pulse signal and the lower part of said first pulse signal being greater than said upper amplitude level, and means for deriving the said timed pulse signal from said output circuit.

25. In an electrical system for forming a timed pulse signal whose occurrence is dependent upon the presence of one pulse signal and whose pulse terminations are timed by a timing pulse signal, the combination of a signal-amplitude-responsive device having an input circuit and an output circuit constructed and arranged to form in response to an input signal, an output signal corresponding to and determined solely by that portion of the input signal between a lower and an upper amplitude level, means for forming a pulse signal having a step-like pulse termination in which the lower part of the pulse rises abruptly to an amplitude less than said lower amplitude level and the upper part of the pulse rises abruptly to a second amplitude greater than said upper amplitude level, means forming a timing pulse signal harmonically related in frequency to said first pulse signal, the time interval between the beginning of a pulse of said first pulse signal and the time when the amplitude of such signal exceeds the upper amplitude level being less than one period of said timing pulse signal, means for combining said first pulse signal and said timing pulse signal in the input circuit of said amplitude-responsive device, the amplitude of said timing pulse signal being less than said lower amplitude level, and the sum of the amplitudes of said timing pulse signal and the lower part of said first pulse signal being greater than said upper amplitude level, and means for deriving the said timed pulse signal from said output circuit.

26. In an electrical system for forming a timed pulse signal whose occurrence is dependent upon the presence of one pulse signal and whose pulse terminations are timed by a timing pulse signal, the combination of a signal-amplitude-responsive device having an input circuit and an output circuit constructed and arranged to form in response to an input signal, an output signal corresponding to and determined solely by that portion of the input signal between a lower and an upper amplitude level, means for forming a pulse signal having a step-like pulse termination in which the lower part of the pulse rises abruptly to an amplitude less than said lower amplitude level and the upper part of the pulse rises abruptly to a second amplitude greater than said upper amplitude level, means for forming a timing pulse signal harmonically related in frequency to said first pulse signal, the pulse of said first pulse signal starting before the occurrence of a pulse of said timing pulse signal and increasing to an amplitude greater than the upper amplitude level during the duration of the pulse of said timing signal, means for combining said first pulse signal and said timing pulse signal in the input circuit of said amplitude-responsive device, the amplitude of said timing pulse signal being less than said lower amplitude level, and the sum of the amplitudes of said timing pulse signal and the lower part of said first pulse signal being greater than said upper amplitude level, and means for deriving the said timed pulse signal from said output circuit.

27. In an electrical system for forming a timed pulse signal whose occurrence is dependent upon the presence of one pulse signal and whose pulse terminations are timed by a timed pulse signal, the combination of a signal-amplitude-responsive device having an input circuit and an output circuit constructed and arranged to form in response to an input signal, an output signal corresponding to and determined solely by that portion of the input signal between a lower and an upper amplitude level, means for forming a pulse signal having step-like pulse terminations in which the lower part of the pulse rises abruptly to an amplitude less than said lower amplitude level and the upper part of the pulse rises abruptly to a second amplitude greater than said upper amplitude level, means forming a timing pulse signal harmonically related in frequency to said first pulse signal, the terminations of the upper part of the pulse of said first pulse signal being spaced from the terminations of the lower part of the pulse by time intervals each less than one period of said timing pulse signal, means for combining said first pulse signal and said timing pulse signal in the input circuit of said amplitude-responsive device, the amplitude of said timing pulse signal being less than said lower amplitude level, and the sum of the amplitudes of said timing pulse signal and the lower part of said first pulse signal being greater than said upper amplitude level, and means for deriving the said timed pulse signal from said output circuit.

28. In an electrical system for forming a timed pulse signal whose occurrence is dependent upon the presence of one pulse signal and whose pulse terminations are timed by a timing pulse signal, the combination of a signal-amplitude-responsive device having an input circuit and an output circuit constructed and arranged to form in response to an input signal, an output signal corresponding to and determined solely by that portion of the input signal between a lower and an upper amplitude level, means for forming a pulse signal having step-like pulse terminations in which the lower part of the pulse rises abruptly to an amplitude less than said lower amplitude level and the upper part of the pulse rises abruptly to a second amplitude greater than said upper amplitude level, means forming a timing pulse signal harmonically related in frequency to said first pulse signal, said timing signal comprising spaced pulses one of which commences and another of which ends during the respective time intervals between the terminations of the lower and upper parts of said first pulse signal, means for combining said first pulse signal and said timing pulse signal in the input circuit of said amplitude-responsive device, the amplitude of said timing pulse signal being less than said lower amplitude level, and the sum of the amplitudes of said timing pulse signal and the lower part of said first pulse signal being greater than said upper amplitude level, and means for deriving the said timed pulse signal from said output circuit.

29. In an electrical system for forming timed pulse signals, a source of signals of one frequency, means for forming two pulse signals of flattened-wave-shape, means for deriving from said source a timing pulse signal whose frequency is a harmonic of the frequency of one of said pulse signals, means for adjusting the duration and occurrence of the individual pulses of said pulse signals, so that the respective pulses of said pulse signals overlap, and the time interval between the commencement or ending of overlapping pulses is less than one period of said harmonic frequency, means for combining said timing pulse signal and said two first-mentioned pulse signals to produce a resultant signal, and signal-amplitude-responsive means energized by said resultant signal for transmitting a portion of that signal when the amplitude thereof is greater than the amplitude of any one of the constituent signals.

30. In an electrical system for forming timed pulse signals, a source of signals of one frequency, means for forming two pulse signals of flattened-wave-shape, means for deriving from said source a timing pulse signal whose frequency is a harmonic of the frequency of one of said pulse signals, means for adjusting the duration and occurrence of the individual pulses of said pulse signals, so that the respective pulses of said pulse signals overlap, and the time interval between the commencement or ending of overlapping pulses is less than one period of said harmonic frequency, means for combining said timing pulse signal and said two first-mentioned pulse signals to produce a resultant signal, and signal-amplitude-responsive means energized by said resultant signal for transmitting a portion of that signal between two amplitude levels one of which is greater than the amplitude of any one of the constituent signals while the other is less than the sum of the amplitudes of any two of said signals.

31. In an electrical system for forming timed pulse signals, a source of signals of one frequency, means for forming two pulse signals of flattened-wave-shape, means for deriving from said source a timing pulse signal whose frequency is a harmonic of the frequency of one of said pulse signals, means for adjusting the duration and occurrence of the individual pulses of said flattened-wave signals so that they overlap and one pulse commences before the commencement of said timing signal while the other pulse commences during the occurrence of the timing signal, and the time interval between the commencement or ending of overlapping pulses is less than one period of said harmonic frequency, means for combining said timing pulse signal and said two first-mentioned pulse signals to produce a resultant signal, and signal-amplitude-responsive means energized by said resultant signal for transmitting a portion of that signal when the amplitude thereof is greater than the amplitude of any one of the constituent signals.

32. In an electrical system for forming pulse signals, the method which comprises forming a wave signal, modifying said signal to flatten the wave shape thereof, forming a second wave signal similar in frequency and wave shape to said first signal but displaced in time relation with respect thereto, modifying said second signal to flatten the wave shape thereof, and combining said flattened-wave signals to form a resultant pulse signal.

33. In an electrical system for forming pulse signals, the method which comprises forming a wave signal, modifying said signal to flatten the wave shape thereof, forming a second wave signal similar in frequency and wave shape to said first signal but displaced in time relation with respect thereto, modifying said second signal to flatten the wave shape thereof, combining said flattened-wave signals to form a resultant pulse signal, and transmitting only pulses of one polarity of said resultant pulse signal.

34. In an electrical system for forming pulse signals, the method which comprises forming a wave signal, modifying said signal to flatten the wave shape thereof and to provide positive and negative pulses of unequal duration, forming a second wave signal similar in frequency and wave shape to said first signal but displaced in time relation with respect thereto, modifying said second signal to flatten the wave shape thereof and to provide positive and negative pulses such that the shorter pulse of said first flattened-wave signal occurs within the duration of one pulse of said second flattened-wave signal, and combining said flattened-wave signals to form a resultant pulse signal having two pulses during each cycle of said first-mentioned wave signal.

35. In an electrical system for forming a timed pulse signal whose occurrence is dependent upon the presence of one pulse signal and whose pulse terminations are timed by a timing pulse signal, the method which comprises establishing a certain amplitude level which determines whether a signal is of sufficient amplitude to be transmitted, forming a pulse signal in which the signal amplitude rises abruptly to an amplitude less than said amplitude level, forming a timing pulse signal harmonically related in frequency to said first pulse signal, the amplitude of said timing pulse signal being less than said amplitude level and the sum of the amplitudes of both of said pulse signals being greater than said amplitude level, combining said pulse signals to form a resultant signal whose amplitude exceeds said amplitude level, and transmitting only that portion of said resultant signal in excess of said amplitude level to thereby derive said timed pulse signal.

36. In an electrical system for forming timed pulse signals, the method which comprises forming a pulse signal of rectangular wave-shape, forming a second signal whose frequency is a harmonic of the frequency of said pulse signal, combining said signals to produce a resultant signal, and utilizing said resultant signal to produce an output pulse signal corresponding to said second signal during the simultaneous occurrence of said first pulse signal and said second signal, while preventing the formation of an output signal during the occurrence of either signal alone.

37. In an electrical system for forming a timed pulse signal whose occurrence is dependent upon the presence of one pulse signal and whose pulse terminations are timed by a timing pulse signal, the method which comprises establishing a lower amplitude level and an upper amplitude level which define a transmission range, forming a pulse signal having a step-like wave termination in which the signal amplitude of the pulse rises abruptly to an amplitude less than said lower amplitude level and subsequently rises abruptly to a second amplitude greater than said upper amplitude level, forming a timing pulse signal harmonically related in frequency to said first pulse signal, the amplitude of said timing pulse signal being less than said lower amplitude level and the sum of the amplitudes of said timing pulse signal and the initial portion of said first pulse signal being greater than said upper amplitude level, combining said pulse signals to form a resultant signal, and transmitting only that portion of said resultant signal between said amplitude levels to thereby derive said timed pulse signal.

38. In an electrical system for forming timed pulse signals, the method which comprises forming two pulse signals of flattened-wave shape, forming another signal whose frequency is a harmonic of the frequency of one of said pulse signals, adjusting the duration and occurrence of the individual pulses of said pulse signals, so that the respective pulses of said pulse signals overlap, and the time interval between the commencement or ending of overlapping pulses is less than one period of said harmonic frequency, combining said derived signal and said pulse signals to produce a resultant signal, and transmitting a portion of said resultant signal when the amplitude thereof is greater than the amplitude of any one of the constituent signals.

FRANK J. BINGLEY.